United States Patent
Mušák et al.

(10) Patent No.: US 11,682,993 B1
(45) Date of Patent: Jun. 20, 2023

(54) APPARATUS AND METHOD FOR DETERMINING MECHANICAL PARAMETERS OF AN ELECTRIC MOTOR AND LOAD

(71) Applicant: NXP USA, Inc., Austin, TX (US)

(72) Inventors: Marek Mušák, Pruzina (SK); Tomáš Fedor, Svedernik (SK); Marek Štulrajter, Dolny Hricov (SK)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/739,023

(22) Filed: May 6, 2022

(51) Int. Cl.
| | |
|---|---|
| H02P 21/10 | (2016.01) |
| H02P 21/18 | (2016.01) |
| H02P 21/34 | (2016.01) |
| H02P 21/13 | (2006.01) |
| H02P 21/22 | (2016.01) |

(52) U.S. Cl.
CPC .............. H02P 21/22 (2016.02); H02P 21/10 (2013.01); H02P 21/13 (2013.01); H02P 21/18 (2016.02); H02P 21/34 (2016.02); H02P 2207/05 (2013.01)

(58) Field of Classification Search
CPC .......... H02P 21/22; H02P 21/10; H02P 21/13; H02P 21/18; H02P 21/34; H02P 2207/05; H02P 21/0017; H02P 21/0014; H02P 21/143
See application file for complete search history.

(56) References Cited

U.S. PATENT DOCUMENTS 8,963,461 B2 * 2/2015 Arima .................... H02P 21/24
318/400.02
2016/0161562 A1 6/2016 Stulrajter

FOREIGN PATENT DOCUMENTS

EP 0476588 A1 3/1992

OTHER PUBLICATIONS

J.A. Cortajarena, "Sensorless Induction Motor Parameter Identification and Control", IEEE, 404-409 (Year: 2010).*
Marek Musak et al., U.S. Appl. No. 17/125,771, filed Dec. 17, 2020, entitled Apparatus And Method For Determining Electrical Characteristics Of An Electric Motor.
John H. Floros et al., NXP, Faster Motor Control Development, Automotive Microcontrollers and Processors, Oct. 5, 2016.
Riccardo Colombo et al., Sensor-less Estimation of Frictions and Moment of Inertia of a Stepper Motor in a Machining Device, May 16, 2017.
(Continued)

*Primary Examiner* — Bickey Dhakal

(57) ABSTRACT

A method, system, and apparatus are provided for determining mechanical characteristics of an electric motor and mechanical load with a speed signal modulator, FOC current loop, sensor-less rotor speed estimator, and speed signal demodulator which are configured to provide a q-axis AC reference current, q-axis DC reference current, estimated maximum AC rotor speed, estimated DC rotor speed, estimated phase angle of the AC rotor speed component, and torque constant to a mechanical characteristics estimator which is configured to determine a plurality of load torque parameters for the electric motor and mechanical load which include a combined moment of inertia parameter, a combined static friction, and a combined viscous friction coefficient parameter.

20 Claims, 7 Drawing Sheets

(56) References Cited

OTHER PUBLICATIONS

Michael Hoerner et al., Automated parameter identification of fractional horse power permanent magnet synchronous motors, GMM-Fachbericht 89: Innovative Klein—und Mikroantriebstechnik, Sep. 28, 2017.

Niklas Konig et al., Parameter Identification of Star-Connected PMSMs by Means of a Sensorless Technique, 2018 Thirteenth International Conference on Ecological Vehicles and Renewable Energies (EVER), Apr. 10-12, 2018.

Niklas Konig et al., Robust Electrical and Mechanical Parameter Identification of Low-Power PMSMs, GMM-Fachbericht 89: Innovative Klein—und Mikroantriebstechnik, Sep. 28, 2017.

Z.Q. Zhu et al., Online Parameter Estimation for Permanent Magnet Synchronous Machines: An Overview, accepted Apr. 9, 2021, date of publication Apr. 13, 2021, https://doi.org/10.1109/ACCESS.2021.3072959.

* cited by examiner

APPARATUS AND METHOD FOR DETERMINING MECHANICAL PARAMETERS OF AN ELECTRIC MOTOR AND LOAD

BACKGROUND OF THE INVENTION

Field of the Invention

The invention relates generally to the field of electric motors. In one aspect, the present invention relates to determining mechanical characteristics of an electric motor and load system.

Description of the Related Art

The determination or estimation of mechanical parameters, such as the moment of inertia, friction coefficient, and magnetic flux linkage of permanent magnets, for example, is useful to the designer and user of electric motor equipment. For example, mechanical parameters are important for motor control designer because they describe complete mechanical system of the electric drive which includes a motor and load. To control this system in closed loop, mechanical parameters have to be precisely identified to get maximum performance. While there are methods for estimating the mechanical parameter values, most do not identify all of the parameters that represent the complete mechanical system. In addition, many conventional mechanical parameter estimation techniques rely on position sensors, but such sensors add cost and increase complexity (due the additional sensors, wiring, connectors, soldering, etc.), reduce reliability (due in part to the sensor connectors that are prone to contamination from dirt and humidity), and are not suitable for applications (e.g., where the rotor is in closed housing and the number of electrical entries must be kept to a minimum, such as in a compressor, or in applications where the motor is immersed in a liquid such as some pumps). While sensor-less motor control techniques may be used to determine or estimate one or more motor mechanical parameters, sensor-less motor control techniques have a number of drawbacks, including operational complexity, expensive microcontroller requirements, and increased bill-of-materials costs.

As seen from the foregoing, existing solutions for operating and controlling electric motors are extremely difficult at a practical level by virtue of the challenges with efficiently, accurately, and autonomously identifying all parameters of the mechanical system with no user intervention or sensor inputs. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A sensor-less motor control method and apparatus are described for reliably, efficiently, and autonomously identifying all mechanical parameters of an electric drive system with reduced software complexity and hardware costs. In selected embodiments, a software-based method and apparatus are provided for controlling a permanent magnet (PM) motor, such as a 3-phase AC PM motor, with a multi-step sensor-less control approach which uses a field-oriented control (FOC) current loop, rotor flux estimator, angle tracking observer, and speed modulator/demodulator to determine the mechanical parameters of a PM motor drive based on the specific modulation of the q-axis (torque-component) current and unique demodulation of the speed response. By controlling the rotor speed, there is no requirement for adjusting the torque (current) demand, and all mechanical parameters—including at least a first mechanical parameter J representing the combined moment of inertia of the motor and load, a second mechanical parameter A representing the combined static or coulomb friction of the motor and load, a third mechanical parameter B representing the combined viscous friction coefficient of the motor and load which can represent also load proportional to the rotational speed (gearbox characteristic), a fourth mechanical parameter C representing the load proportional to the square of the rotational speed (fan characteristic), and a fifth mechanical parameter D representing the load proportional to cube of the rotational speed (pump characteristic)—can be estimated with a technique that is robust to cogging torque, static friction and breakaway torque since the rotor speed does not reverse during the estimation process.

Figure 1:
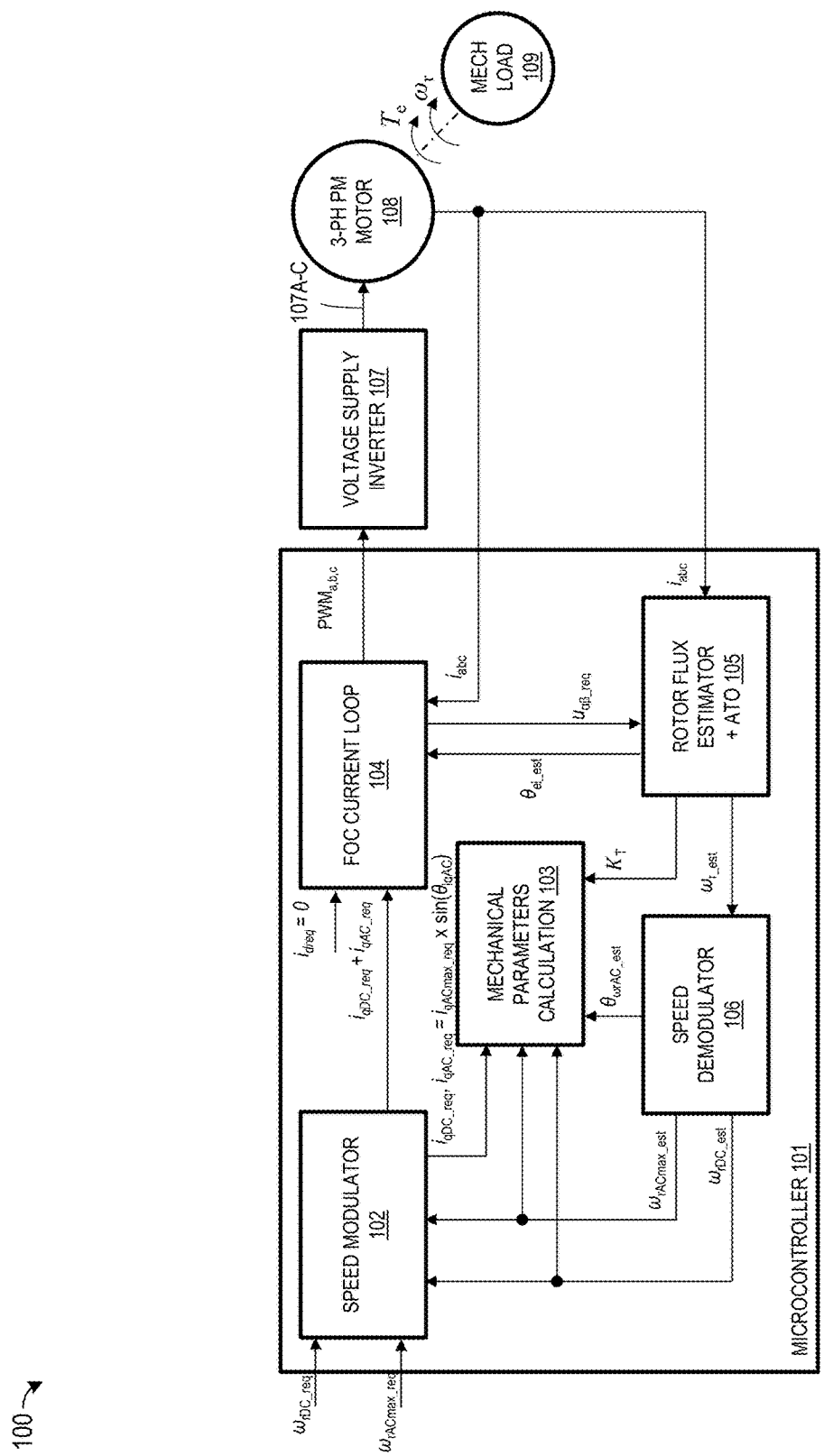
FIG. 1 is a simplified block diagram of an electric load drive system including apparatus for determining mechanical parameters of an electric motor and load in accordance with selected embodiments of the present disclosure.

Referring now to FIG. 1, there is shown a simplified block diagram of an electric load drive system 100 that includes a microcontroller 101 connected to drive a voltage supply inverter 107, a motor 108, and a mechanical load 109. The depicted motor control microcontroller 101 includes and/or controls a speed signal modulation unit 102, field-oriented control (FOC) unit 104, a rotor flux estimator and angle tracking observer unit 105, a speed demodulator unit 106, and an estimator unit 103 to determine mechanical parameters of the sensor-less driven PM motor drive 108, 109 based on the specific modulation of the q-axis (torque-component) current and unique demodulation of the speed response. The microcontroller 101 may be implemented with a processor or other control logic execution device for providing a motor control circuit functionality for the units 102-106 which are used to control, drive, and measure the current and voltage signals provided to the voltage supply inverter 107 and/or received from the motor 108. Voltage supply inverter 107 may be used to control the power applied to the electric motor 108 which may be, for example, a permanent magnet synchronous motor (PMSM), such as 3-phase PM motor 108, that is connected to drive a mechanical load 109, such as a pump, fan, or gearbox. For most common 3-phase motors, the voltage supply inverter 107 may use a 3-phase H-bridge inverter circuit which uses a plurality of power transistors to selectively couple a supply voltage (e.g., $U_{DC\_BUS}$) and ground voltage inputs to the three outputs 107a-c in response to input PWM gate control signals.

By way of background information, parameters of electric motors play an important role for motor control designers since they can be used for numerical simulations to analyze machine behavior and characteristics at various operating conditions, including machine faults, overloads, etc. Motor parameters have to be precisely determined in order to fully utilize motor capabilities to deliver maximum torque and efficiency defined by the motor manufacturer. To satisfy such a condition, standard or more advanced model-based control techniques have to be used to analyze motor performance by using a mathematical model of the electric machine, and parameters of the motor represent coefficients of this mathematical model. Parameters used in mathematical model of the motor can be classified into electrical, magnetic, and mechanical parameters. Embodiments disclosed herein identify the mechanical parameters of the permanent magnet (PM) motor drives which include a motor and mechanical load, namely a first mechanical parameter J for the combined moment of inertia of the motor and load, a second mechanical parameter A for the combined static friction torque of the motor and load, a third mechanical parameter B for the combined viscous friction coefficient of the motor and a gearbox-like load which can represent the load components that are proportional to the speed $\omega_r$, a fourth mechanical parameter C for a fan-like load that is proportional to the square of the speed $\omega_r$, or a fifth mechanical parameter D for a pump-like or compressor-like load that is proportional to cubic of the speed $\omega_r$.

To analyze the behavior of the PM motor or to design model-based control technique, a mathematical model of the PM motor and its parameters is required. The electrical part of the PM motor can be represented by voltage equations in orthogonal two-phase synchronous reference frame (characterized by d-q symbols):

$$\begin{bmatrix} u_d \\ u_q \end{bmatrix} = R_s \begin{bmatrix} i_d \\ i_q \end{bmatrix} + \begin{bmatrix} L_d & 0 \\ 0 & L_q \end{bmatrix} \frac{d}{dt} \begin{bmatrix} i_d \\ i_q \end{bmatrix} + \omega_e \begin{bmatrix} 0 & -L_q \\ L_d & 0 \end{bmatrix} \begin{bmatrix} i_d \\ i_q \end{bmatrix} + \omega_e \Psi_{PM} \begin{bmatrix} 0 \\ 1 \end{bmatrix} \quad (1)$$

where the symbol descriptions and corresponding units are given in the table below:

| Symbol | Description | Unit |
| --- | --- | --- |
| $u_d$ | d-axis voltage | V |
| $u_q$ | q-axis voltage | V |
| $R_s$ | stator resistance | Ω |
| $i_d$ | d-axis current | A |
| $i_q$ | q-axis current | A |
| $L_d$ | d-axis synchronous inductance | H |
| $L_q$ | q-axis synchronous inductance | H |
| $\omega_e$ | electrical angular frequency | rad/s |
| $\psi_{PM}$ | magnetic flux linkage of permanent magnets | Vs |

It can be seen that Equation (1) represents a non-linear cross dependent system with cross-coupling terms in both d and q axis and back-EMF voltage component in the q-axis. When FOC concept is employed, both cross-coupling terms shall be compensated in order to allow independent control of current d and q components.

As will be appreciated by those skilled in the art, the stator resistance $R_s$, d-axis inductance $L_d$, and q-axis inductance $L_q$ are electrical parameters of the PM motor, while the magnetic flux linkage of permanent magnets $\psi_{PM}$ introduces a magnetic parameter of the PM motor. An apparatus and method for determining the electrical parameters of an electronic motor are described in U.S. patent application Ser. No. 17/125,771 which was filed on Dec. 17, 2020.

In similar fashion, the mechanical part of the PM motor can be represented by the electromagnetic torque Equation (2) and mechanical Equation (3):

$$T_e = \frac{3}{2} \cdot pp \cdot (\psi_{PM} \cdot i_q + (L_d - L_q) \cdot i_d \cdot i_q) \quad (2)$$

$$T_e = T_l + J \frac{d\omega_r}{dt} \quad (3)$$

where $T_e$ is electromagnetic torque of the PM motor, pp is the number of motor pole pairs, $T_l$ is the load torque, $\omega_r$ is the rotor speed, and J is the moment of inertia. As will be appreciated by those skilled in the art, the moment of inertia J is mechanical parameters of the PM motor and load.

To incorporate the effects of a load being coupled to the motor, the mechanical load term $T_l$ may be rewritten as the sum of three components $T_l = T_F + T_L$, where $T_F$ is the friction torque, $T_W$ is windage torque, and $T_L$ is torque doing useful mechanical work. In turn, the friction torque $T_F$ is the sum of three components $T_F = T_V + T_C + T_S = B\omega_r + T_C + T_S$, where $T_V$ is viscous friction, $T_C$ is coulomb friction, $T_S$ is static friction, B is viscous friction coefficient, and $\omega_r$ is mechanical speed. In addition, the windage torque $T_W$, which is the motion-opposing torque when the motor runs, is proportional to the square of the speed is given by $T_E = C\omega_r^2$, where C is constant. In addition, the mechanical work torque $T_L$ which drives automotive or industrial loads will have different values, depending on the torque-speed characteristic of the load. For example, a gearbox load has a linear torque-speed characteristic, therefore $T_L = k_1 \omega_r$. Alternatively, a fan load has a quadratic torque-speed characteristic, therefore $T_L = k_2 \omega_r^2$. Alternatively, a pump/compressor has a cubic torque-speed characteristic, therefore $T_L = k_3 \omega_r^3$. Based on the foregoing, the total load torque $T_l$ is expressed as $T_l = \text{sign}(\omega_r) \cdot (A + B|\omega_r| + C|\omega_r^2| + D|\omega_r^3|)$ where the sign function of the speed $\omega_r$ (sign($\omega_r$)) is added for opposite direction. In this expression, sign($\omega_r$)×A is the constant torque (constant braking) term that includes coulomb friction torque of the motor $T_{FM}$ and load $T_{FL}$. In addition, $\text{sign}(\omega_r) \times B|\omega_r|$ is a torque component term that varies linearly with speed (brake directly proportional to speed), where B is a constant that might include viscous friction coefficient of the motor $B_M$, load $B_L$ and a gearbox constant $k_1$. In addition, $\text{sign}(\omega_r) \times C|\omega_r^2|$ is a torque component term that varies quadratically with speed (brake proportional to square of the speed), where the C parameter might include windage constant C of the motor and fan constant $k_2$. In addition, $\text{sign}(\omega_r) \times D|\omega_r^3|$ is a torque component term that varies cubically with speed (brake proportional to cube of the speed), where the D parameter represents pump or compressor constant $k_3$.

As can be seen, there are multiple torque components different constants included in the mechanical Equation (3) for the PM motor and load when rewritten $$T_e = T_l + J\frac{d\omega_r}{dt} = \left(T_C + T_S + B\omega_r + C\omega_r^2 + k_i\omega_r^i\right) + J\frac{d\omega_r}{dt}.$$

In order to simplify the equation and summarize all components into one general form that will describe torque-speed characteristic of most common automotive or industrial loads (e.g., gearbox, fan, pump, compressor), the following equation represents general form of the motor torque equation with external mechanical load coupled to motor:

$$T_e = J\frac{d\omega_r}{dt} + \text{sign}(\omega_r) \cdot \left(A + B|\omega_r| + C|\omega_r^2| + D|\omega_r^3|\right) \quad (4)$$

where J is the mechanical parameter representing the combined moment of inertia of the motor and load, A is the mechanical parameter representing the combined static or coulomb friction of the motor and load, B is the mechanical parameter representing the combined viscous friction coefficient of the motor and load which can represent also load proportional to the rotational speed (gearbox characteristic), C is the mechanical parameter representing the load proportional to the square of the rotational speed (fan characteristic), and D is the mechanical parameter representing the load proportional to cube of the rotational speed (pump characteristic).

Figure 3:
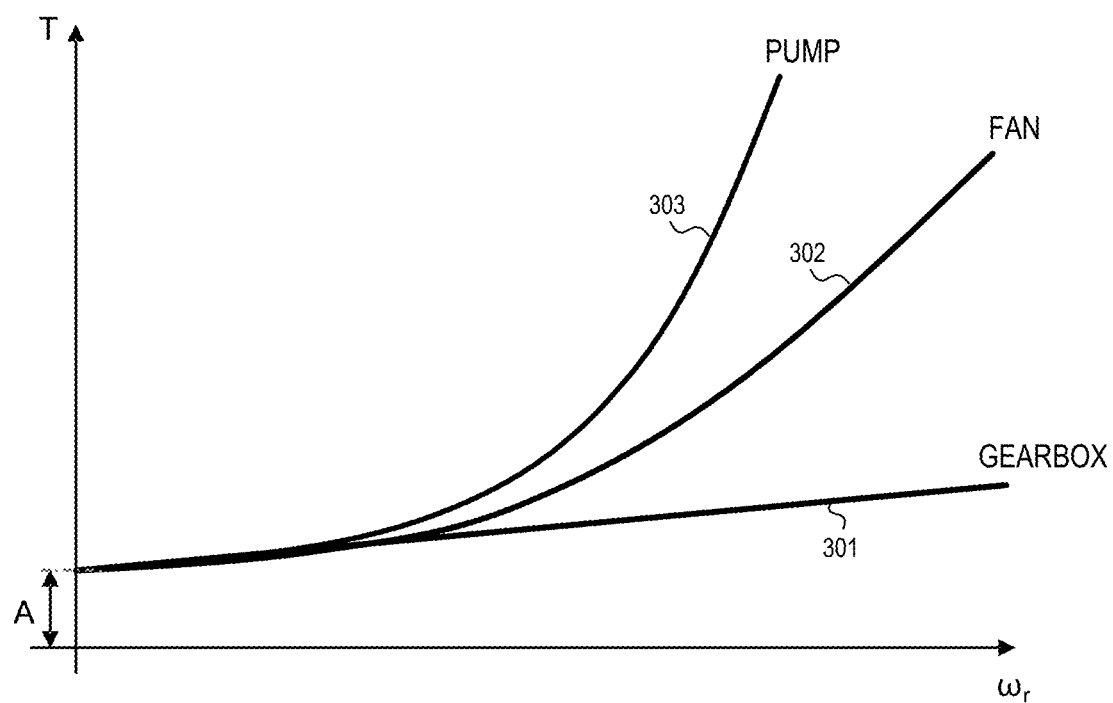
FIG. 3 shows torque-speed characteristics of various mechanical loads at steady state conditions.

To provide additional details for an improved understanding of selected embodiments of the present disclosure, reference is now made to FIG. 3 which depicts a plot 300 of torque-speed characteristics ($T_1$ vs. $\omega_r$) of various loads at steady state conditions. As depicted, the gearbox load has a substantially linear torque-speed characteristic 301 that is proportional to the rotational speed (e.g., $T_L = k_1 \omega_r$). In addition, the fan load has a quadratic torque-speed characteristic 302 that is proportional to the square of the rotational speed (e.g., $T_L = k_2 \omega_r^2$). And the pump load has a cubic torque-speed characteristic 303 that is proportional to the cubic of the rotational speed (e.g., $T_L = k_3 \omega_r^3$). Each of the depicted torque-speed characteristics 301-303 starts with an initial torque value corresponding to the mechanical parameter A which represents the combined static or coulomb friction of the motor and load.

Figure 2:
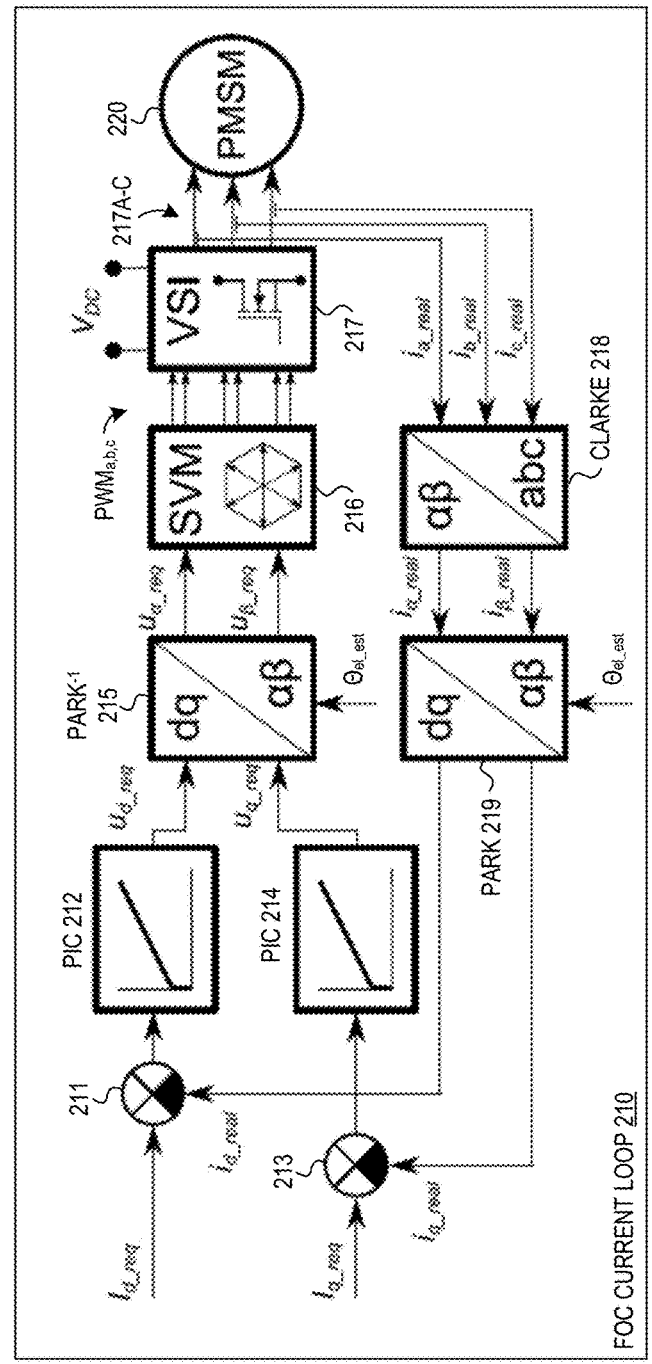
FIG. 2 is a simplified block diagram of an electric drive system which includes a field-oriented control current loop for controlling a permanent magnet synchronous motor in accordance with selected embodiments of the present disclosure.

To provide additional details for an improved understanding of selected embodiments of the present disclosure, reference is now made to FIG. 2 which depicts a simplified block diagram of an electric drive system 200 which includes a field-oriented control (FOC) current loop 210-219 connected to control a permanent magnet synchronous motor (PMSM) 220. As depicted, FOC current loop 211-219 includes a direct-current (D-current) control block 212, a quadrature-current (Q-current) control block 214, inverse Park transformation block 215, space vector modulation block 216, voltage supply inverter (VSI) block 217, Clarke transformation block 218, and Park transformation block 219 for controlling the magnetizing and torque-producing components of the stator current in the PMSM 220.

In operation, a first adjustment or mixer block 211 receives a first reference variable input signal ($i_{d\_req}$) and a feedback d-component motor current signal (e.g., $i_{d\_real}$) from the Park transformation block 219. The first adjustment or mixer block 211 subtracts the feedback signal ($i_{d\_real}$) from the first reference variable input signal ($i_{d\_req}$) to provide a signal to the D-current control block 212 which may be implemented, for using a proportional-example, integral (PI) controller (PIC). PIC block 212 provides a signal $u_{d\_req}$ to the inverse Park transformation block 215. In this case, the signal $u_{d\_req}$ represents the d coordinate component for the rotor related orthogonal coordinate reference frame system (d,q).

In addition, a second adjustment or mixer block 213 receives a second reference variable input signal ($I_{q\_req}$) and a feedback q-component motor current signal (e.g., $i_{q\_real}$) from the Park transformation block 219. The second adjustment or mixer block 213 subtracts the feedback real ($i_{q\_real}$) from the second reference variable input signal ($I_{q\_req}$) to provide a signal to the Q-current control block 214 which may be implemented, for example, using a PI controller (PIC). PIC block 214 provides a signal $u_{q\_req}$ to the inverse Park transformation block 215. In this case, the signal $u_{u\_req}$ represents the q coordinate component for the rotor related orthogonal coordinate reference frame system (d,q).

Inverse Park transformation block 215 provides first and second output signals $u_{\alpha\_req}$, $U_{\beta\_req}$ to the space vector modulation (SVM) block 216, where the output signals $u_{\alpha\_req}$, $u_{\beta\_req}$ represent orthogonal coordinate components for the stator related orthogonal coordinate reference frame system ($\alpha$, $\beta$). Space vector modulation block 216 provides pulse width modulation (PWM) motor drive signals $\text{PWM}_{a,\,b,\,c}$ to VSI block 217 which provides motor drive signals 217a-c on conductors to the electric motor 220 according to PWM motor drive signals $\text{PWM}_{a,\,b,\,c}$.

In response to the motor drive signals 217a-c, motor current signals ($i_{a\_real}$, $i_{b\_real}$ and $i_{c\_real}$) are input to the Clarke transformation block 218 which converts the three-phase signals ($i_{a\_real}$, $i_{b\_real}$ and $i_{c\_real}$) to a two-dimensional orthogonal system and ($i_{\alpha\_real}$ and $i_{\beta\_real}$). As will be appreciated, it is not required to measure all three currents, since the sum of the three must equal unity so that the third current must be the negative sum of the first two. At the Park transformation block 219, the two-axis stationary system ($i_{\alpha\_real}$ and $i_{\beta\_real}$) are converted to a two-axis rotating system ($i_{q\_req}$, $i_{d\_real}$), where the d axis current is aligned to the rotor flux and the q axis current (the torque-producing component) is orthogonal to the rotor flux. The Inverse Park transformation block 215 and Park transformation block 219 both receive an input signal $\theta_{el\_est}$ representing the estimated the rotor flux angle relative to stator phase. In turn, the Park transformation block 219 provides the d component motor current signal (e.g., $i_{d\_real}$) to the first adjustment block 211 and also provides the q component motor current signal (e.g., $i_{q\_real}$) to the second adjustment block 213, where the d coordinate component of the motor current vector $i_{d\_real}$ is collinear to the rotor flux d coordinate, and where the q coordinate component of the motor current vector $i_{q\_real}$ is orthogonal to the rotor flux d coordinate.

As will be understood, d-axis current is a flux-producing current that controls the magnetic condition of the motor 220. Standard FOC operation applies a zero d-axis current to ensure that the motor 220 is only magnetized by permanent magnets. In contrast, q-axis current is a torque-producing current that controls electromagnetic torque $T_e$ to accelerate or deaccelerate the motor 220. Such conditions simplify the electromagnetic torque Equation (2) to the following expression:

$$T_e = \frac{3}{2} \cdot pp \cdot \psi_{PM} \cdot i_q = K_T \cdot i_q \tag{5}$$

$$K_T = \frac{3}{2} \cdot pp \cdot \psi_{PM} \tag{6}$$

where the parameter $K_T$ is a torque constant that is a mechanical parameter.

The behavior of the current loop is tuned by proportional gain $K_p$ and integration gain $K_i$ of the PI controllers 212, 214. To achieve the required dynamic and characteristics of the current response during transients, the proportional gain $K_p$ and integration gain $K_i$ parameters of the PI controllers 212, 214 may be designed using any suitable method, such as using a pole placement method which is an approach of the feedback control system theory which places the closed-loop poles of a plant in predetermined locations. The pole placement approach may also be used for designing a speed control. For example, by using a simplified closed current control loop that is closed by a PI controller, the speed control with zero steady state error may be enabled by considering a general form of closed loop with a first order plant and PI controller:

$$G_{PI\_\omega}(s) = \frac{K_{p\_\omega} \cdot s + K_{i\_\omega}}{s} \tag{7}$$

$$G_M(s) = \frac{K_T}{Js - B} \tag{8}$$

where B and J are mechanical parameters, where the symbol "s" represents the pole in the Laplace domain, and where $K_T$ represents torque constant which can be determined when both the pp and $\psi_{PM}$ parameters of Equation (6) are known. In most cases, the B and J parameters are considered as a system's parameters, while A, C, D are taken as external errors to the system which might be neglected in the control design, depending on the design perspective since all parameters can be considered as system's parameters for designing more robust control structures. Then the speed closed loop transfer function is derived in Laplace domain as follows:

$$G_\omega(s) = \frac{\omega_{real}(s)}{\omega_{req\_ZC}(s)} = \frac{G_{PI\_\omega}(s) \cdot G_M(s)}{1 + G_{PI\_\omega}(s) \cdot G_M(s)} = \frac{\frac{K_T \cdot K_{i\_\omega}}{J} \cdot \left(\frac{K_{p\_\omega}}{K_{i\_\omega}} \cdot s + 1\right)}{s^2 + s \cdot \frac{K_T \cdot K_{p\_\omega}}{J} + \frac{K_T \cdot K_{i\_\omega}}{J}} \tag{9}$$

The speed PI controller introduces a zero to the closed loop transfer function. The zero can be compensated by introducing a zero cancellation block into the speed feed-forward path, which has the following transfer function:

$$G_{ZC\_\omega}(s) = \frac{1}{\left(\frac{K_{p\_\omega}}{K_{i\_\omega}} \cdot s + 1\right)} \tag{10}$$

The speed loop transfer function with the zero-cancellation block in feed-forward path is then:

$$G_\omega(s) = \frac{\omega_{real}(s)}{\omega_{req}(s)} = \tag{11}$$

$$G_{ZC\_\omega}(s) \cdot \frac{G_{PI\_\omega}(s) \cdot G_M(s)}{1 + G_{PI\_\omega}(s) \cdot G_M(s)} = \frac{\frac{K_T \cdot K_{i\_\omega}}{J}}{s^2 + s \cdot \frac{K_T \cdot K_{p\_\omega}}{J} + \frac{K_T \cdot K_{i\_\omega}}{J}}$$

Then the proportional and integral gains of the PI controller as well as the zero-cancellation block parameters can be derived as follows:

$$K_{p\_\omega} = \frac{2 \cdot \xi \cdot \omega_0 \cdot J - B}{K_T} = \frac{2 \cdot \xi \cdot \omega_0 \cdot J - B}{\frac{3}{2} \cdot pp \cdot \psi_{PM}} \tag{12}$$

$$K_{i\_\omega} = \frac{J}{K_T} \cdot \omega_0^2 = \frac{J}{\frac{3}{2} \cdot pp \cdot \psi_{PM}} \cdot \omega_0^2 \tag{13}$$

As seen from the foregoing, the mechanical parameters B, J and magnetic flux linkage of permanent magnets $\psi_{PM}$ are required to solve Equations (12)-(13) (and also Equations (2)-(3)). While these mechanical parameters can sometimes be obtained from motor datasheet, this is not that straight-forward solution since the mechanical parameters will change, depending on the type of mechanical load (for instance fan, pump, gearbox, etc.) connected to the motor. In such a case, the mechanical parameters must be measured with the motor coupled to the load to obtain the mechanical parameters of the complete mechanical system, as opposed to only the motor, in order to achieve behavior of the speed control loop as designed. Moreover, the mechanical load brings further parameters which cannot be neglected.

While mechanical parameter estimation methods have been proposed, most focus only on the motor itself, and do not consider complete mechanical system of the combined motor and load. In addition, existing mechanical parameter estimation techniques typically focus only on the moment of inertia J, and do not address the complete load characteristic. Another drawback with existing mechanical parameter estimation techniques is that they typically require sensors to detect the position of the motor or load, and are therefore not suitable for sensor-less control applications. Yet another drawback with existing mechanical parameter estimation techniques is that they provide no control of the speed response to demanded torque (current) during the estimation process, making them unsuitable for autonomous estimation of the mechanical parameters since such techniques require that the appropriate torque (current) demand must be measured and adjusted for every new investigated mechanical system.

To address these limitations and others that will be apparent to persons skilled in the art, there is disclosed herein a sensor-less and autonomous apparatus, system, architecture, methodology, and program code for estimating the mechanical parameters and magnetic flux linkage of permanent magnets by controlling the rotor speed so that no adjustments are required. Moreover, it is robust against to cogging torque, static friction and breakaway torque, because rotor speed does not reverse during estimation process. To illustrate selected embodiments of the disclosed solutions, reference is now made back to FIG. 1 which shows that the depicted motor control microcontroller 101 includes and/or controls a speed signal modulation unit 102, a field-oriented control (FOC) unit 104, a rotor flux estimator and angle tracking observer unit 105, a speed demodulator unit 106, and a mechanical parameters calculation unit 103 to determine mechanical parameters of the sensor-less driven PM motor drive 108, 109 based on the specific modulation of the q-axis (torque-component) current and unique demodulation of the speed response. As disclosed herein, one or more of the units 102-106 may be implemented in whole or in part as hardware circuits and/or software, firmware or control code logic accessing from memory which stores programming instructions to be executed to configure the microcontroller 101 into a machine that controls the voltage supply inverter 107 and a three-phase PM motor 108, as disclosed herein.

In whatever form implemented, the microcontroller 101 may include and/or control a first speed modulator unit 102 connected to receive as an input the AC and DC demanded rotor speed components $\omega_{rDC\_req}$, $\omega_{rACmax\_req}$ which may be derived from nominal speed $n_N$ ($\omega_{rN}$), where the nominal speed $n_N$ may be specified in the manufacturer datasheet. For example, the relation between rotor speed in radian per second $\omega_{rN}$ [rad/s] and speed in revolutions per minute $n_N$ [rpm] is given by the equation $\omega_{rN}=2\pi n_N/60$. In addition, the speed modulator unit 102 may be connected in a feedback arrangement to receive the estimated or demodulated DC speed $\omega_{rDC\_est}$ and amplitude of the AC speed $\omega_{rACmax\_est}$. Based on these inputs, the speed modulator unit 102 generates or modulates the desired or requested q-axis DC reference current component $i_{qDC\_req}$ and the q-axis AC reference current component at the desired magnitude $i_{qAC\_req}$ for supply to the FOC current loop unit 104. The speed modulator unit 102 also provides the q-axis DC reference current component $i_{qDC\_req}$ and the q-axis AC reference current component $i_{qAC\_req}$ to the mechanical parameters calculator unit 103. In selected embodiments, the q-axis AC reference current $i_{qAC\_req}$ is represented by the maximum q-axis AC current value $i_{qACmax\_req}$ the modulated frequency $f_{iqAC}$, and phase angle $\theta_{iqAC}$ to the mechanical parameters calculator unit 103. In particular, the speed modulator unit 102 may compute the q-axis AC reference current $i_{qAC\_req}=i_{qACmax\_req}*\sin(2\pi f_{iqAC}*i_{qACmax\_req}*\sin(\theta_{qAC})$.

In addition, the microcontroller 101 may include and/or control a second field-oriented control (FOC) current loop unit 104 which is connected to receive the desired or requested DC q-axis current component $i_{qDC\_req}$, and the AC q-axis current component at the desired magnitude $i_{qAC\_req}$. In addition, the desired or requested d-axis current component is set to zero (e.g., $i_{dreq}=0$). In addition, the FOC current loop unit 104 may be connected in a feedback arrangement to receive the estimated or calculated electrical rotor position $\theta_{el\_est}$ and the measured feedback currents $i_{abc}$. Based on these inputs, the FOC current loop unit 104 generates the required pulse width modulation (PWM) motor drive signals $PWM_{a,b,c}$ for the voltage supply inverter 107. In selected embodiments the FOC current loop unit 104 may be embodied with the blocks 211-219 shown in FIG. 2 which is connected to the voltage supply inverter 107 to control the three-phase permanent magnet motor 108.

The microcontroller 101 may also include and/or control a third rotor flux estimator and angle tracking observer (ATO) unit 105 which is connected to receive the measured feedback currents $i_{abc}$ and the reference voltages $u_{\alpha\beta\_req}$ as inputs. Based on these inputs, the rotor flux estimator and ATO unit 105 generates the estimated electrical rotor position $\theta_{el\_est}$, estimated rotor speed $\omega_{r\_est}$, and torque constant $K_T=3/2\cdot pp\cdot\psi_{PM}$. In addition, the rotor flux estimator and ATO unit 105 provides the torque constant $K_T$ to the mechanical parameters calculator unit 103, and also and estimated electrical rotor position $\theta_{el\_est}$ for input to the Park transformation matrixes of the FOC current loop unit 104.

In addition, the microcontroller 101 may include and/or control a fourth speed demodulator unit 106 which is connected to receive the estimated rotor speed $\omega_{r\_est}$. Based on this input, the speed demodulator 106 detects the phase angle of the AC component of the rotor speed $\theta_{\omega rAC\_est}$ for input to the mechanical parameters calculator unit 103. In addition, the speed demodulator 106 generates the demodulated DC speed $\omega_{rDC\_est}$ and amplitude of the AC speed $\omega_{rACmax\_est}$ for input to the speed modulator unit 102. At steady state conditions, the estimated DC speed component $\omega_{rDC\_est}$ and amplitude of the AC speed component $\omega_{rACmax\_est}$ generated by speed demodulator 106 is equal to the demanded DC speed component $\omega_{rDC\_req}$ and demanded amplitude of the AC speed component $\omega_{rACmax\_req}$ that is input to the speed modulator 102, respectively. The speed demodulator 106 also provides the phase angle of the AC component $\theta_{\omega rAC\_est}$ and demodulated DC speed $\omega_{rDC\_est}$ and amplitude of the AC speed $\omega_{rACmax\_est}$ to the mechanical parameters calculator unit 103. In other embodiments, instead of using "noisy" signals $\omega_{rDC\_est}$ and $\omega_{rACmax\_est}$ (which are noisy because they are calculated from measured noisy currents), the mechanical parameters calculator unit 103 can be connected to receive the demanded speed components $\omega_{rDC\_req}$ and $\omega_{rACmax\_req}$ which are constant signals that are not noisy.

The microcontroller 101 may also include and/or control a fifth mechanical parameters calculator unit 103 which is connected to receive the torque constant $K_T$, phase angle of the AC component $\theta_{\omega rAC\_est}$, demodulated DC speed $\omega_{rDC\_est}$ (or alternatively, the demanded DC speed component $\omega_{rDC\_req}$), demodulated amplitude of the AC speed $\omega_{rACmax\_est}$ (or alternatively, the demanded amplitude of the AC speed component $\omega_{rACmax\_req}$), the desired or requested q-axis DC reference current component $i_{qDC\_req}$, and the q-axis AC reference current component $i_{qAC\_req}$ as inputs. Based on these inputs, the mechanical parameters calculator unit 103 generates and outputs estimated mechanical parameters which may be used to design control systems to operate the motor 108 and load 109 efficiently and accurately.

Although described with reference to a 3-phase AC PM motor 108, the present disclosure may be used with any motor type that can control torque (acceleration/deacceleration) of the motor and measure motor speed. For example, if the FOC driven 3-phase AC permanent magnet motor 108 is replaced by a DC permanent magnet motor, the same mechanical parameters can be obtained for the DC motor by replacing the FOC current loop block 104 with a simple PI controller and by replacing the ATO unit 105 with a suitable speed estimator for the DC PM motor. Thus, it will be appreciated that, with a few modifications, the present disclosure can be applied to any motor type that can control torque (acceleration/deacceleration) of the motor and measure motor speed.

Figure 4:
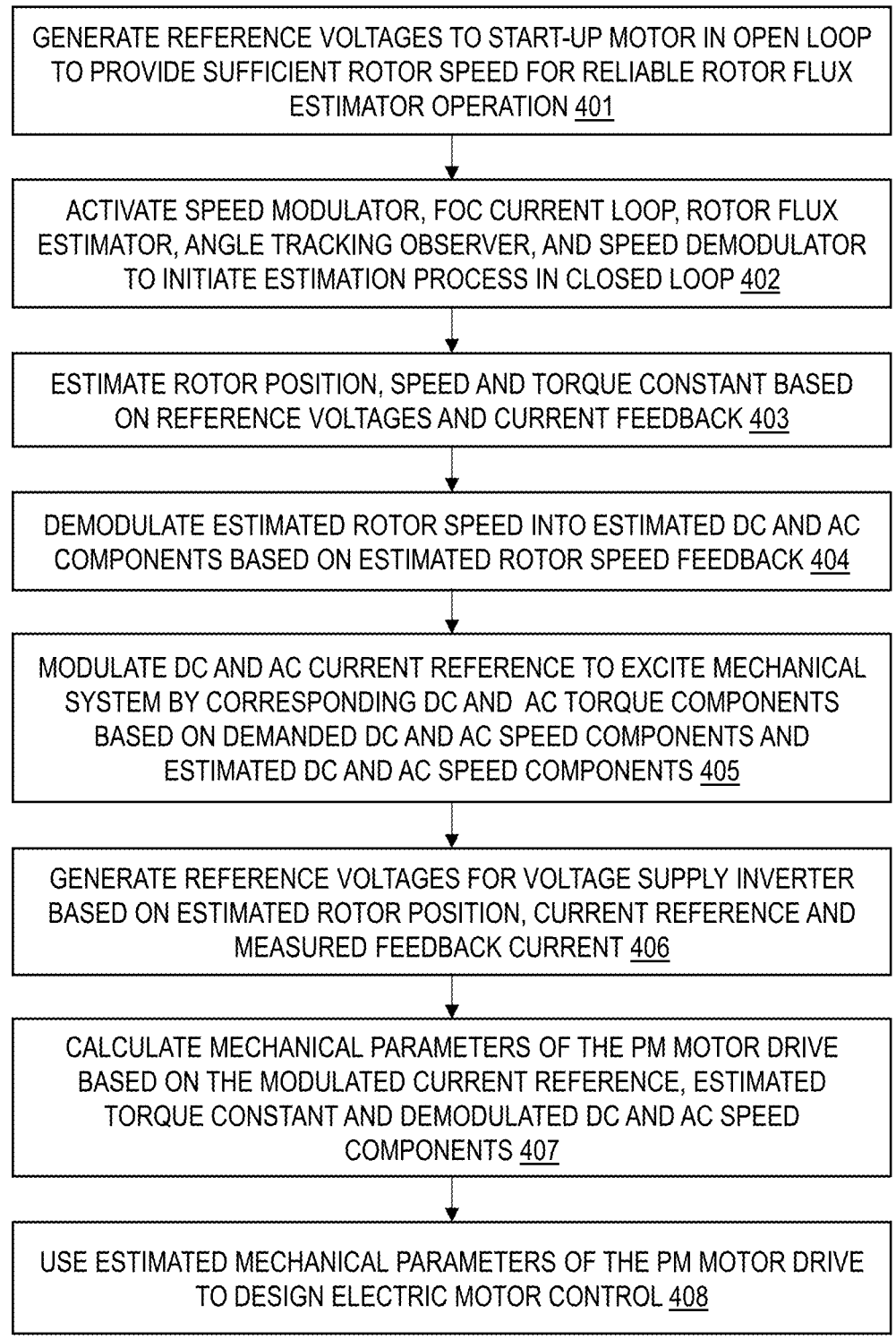
FIG. 4 illustrates a simplified flowchart of the logic for a software-based sensor-less method for estimating the mechanical parameters of an electric motor and load in accordance with selected embodiments of the present disclosure.

To provide additional details for an improved understanding of selected embodiments of the present disclosure, reference is now made to FIG. 4 which is a simplified flowchart sequence 400 illustrating the logic for a software-based sensor-less method for estimating the mechanical parameters of an electric motor and load. At step 401, the method starts as part of the main control algorithm at startup and/or with an interrupt service routine that is invoked manually or on a predetermined basis to periodically or otherwise to start the motor in an open loop by generating reference voltages for the motor to provide sufficient rotor speed for reliable operation of the rotor flux estimator to provide rotor position and speed to the system even without a position sensor. For example, the motor control algorithm, once initialized, may start a three-phase permanent magnet (PM) motor in an open loop by generating reference voltages $\pi U_{\alpha\beta\_req}$ and corresponding duty cycles $PWM_{a,b,c}$ that are provided to the voltage supply inverter which generates the supply reference voltages $u_{abc\_req}$ which supply the 3-phase PM motor 108.

Once the motor has reached a threshold rotor speed, the speed modulator, FOC current loop, rotor flux estimator, angle tracking observer, and speed demodulator are activated at step 402 to initiate the mechanical parameter estimation process in a closed feedback loop. For example, the motor control algorithm may be executed by a microcontroller to load and execute the signal modulation and demodulation, FOC current loop, rotor flux estimation, and angle tracking observer units 102, 104-106, thereby forming a closed control feedback loop where the 3-phase current measurements from the motor 108 are used by the rotor flux estimator and angle tracking observer (ATO) unit 105 to generate the estimated rotor speed $\omega_{r\_est}$. In turn, the estimated rotor speed $\omega_{r\_est}$ is processed or demodulated at the speed demodulator unit 106 to generate the estimated AC and DC speed components $\omega_{rAC\_est}$, $\omega_{rDC\_est}$ for feedback to the speed modulator 102 which controls the DC and AC reference voltages $u_{\alpha\beta\_req}$ and corresponding duty cycles $PWM_{a,b,c}$ that are provided as inputs to the voltage supply inverter 107. The speed demodulator unit 106 also processes the estimated rotor speed $\omega_{r\_est}$ to generate the phase angle of the AC component of the rotor speed $\theta_{\omega rAC\_est}$.

Upon activation, the rotor flux estimator and angle tracking observer estimate the rotor position, speed and torque constant based on the provided reference voltages and current feedback at step 403. For example, the motor control algorithm may be executed by a microcontroller to execute the rotor flux estimation and angle tracking observer unit 105 which processes the measured feedback currents $i_{abc}$ and the reference voltages $u_{\alpha\beta\_req}$ to generate the estimated electrical rotor position $\theta_{el\_est}$, estimated rotor speed $\omega_{r\_est}$, and torque constant $K_T$.

At step 404, the estimated rotor speed is demodulated into estimated DC and AC components based on the provided estimated rotor speed feedback. For example, the motor control algorithm may be executed by a microcontroller to execute the speed demodulator unit 106 which processes the estimated rotor speed $\omega_{r\_est}$ to detect the phase angle of the AC component of the rotor speed $\theta_{\omega rAC\_est}$ and to generate the demodulated DC speed $\omega_{rDC\_est}$ and amplitude of the AC speed $\omega_{rACmax\_est}$.

At step 405, the DC and AC current references are modulated to excite the mechanical system by corresponding DC and AC torque components based on the demanded DC and AC speed components and the estimated DC and AC speed components. For example, the motor control algorithm may be executed by a microcontroller to execute the speed modulator unit 102 which processes the DC and AC current references $i_{qDC\_req}+i_{qAC\_req}$ to excite mechanical system by corresponding DC and AC torque components based on demanded DC and AC speed components $\omega_{rDC\_req}$, $\omega_{rACmax\_req}$ and estimated DC and AC speed components $\omega_{rDC\_est}$, $\omega_{rACmax\_est}$ at the speed modulator 102.

At step 406, the reference voltages for the voltage supply inverter are generated based on the estimated rotor position, current reference, and measured feedback currents. For example, the motor control algorithm may be executed by a microcontroller to execute the FOC current loop unit 104 which processes the desired or requested DC q-axis current component $i_{qDC\_req}$ and the AC q-axis current component at the desired magnitude $i_{qAC\_req}$, the estimated electrical rotor position $\theta_{el\_est}$, and the measured feedback current to generate the required reference voltages $u_{\alpha\beta\_req}$ and corresponding duty cycles $PWM_{a,b,c}$ for the voltage supply inverter 107.

At step 407, the mechanical parameters of the combined motor drive and load are calculated based on the modulated q-axis current reference components $i_{qDC\_req}$, $i_{qAC\_req}$, the estimated torque constant $K_T$, and demodulated DC and AC speed components $\omega_{rDC\_est}$, $\omega_{rACmax\_est}$, and the estimated phase angle of the AC component of the rotor speed $\theta_{\omega rAC\_est}$. For example, the motor control algorithm may be executed by a microcontroller to execute the mechanical parameters calculation unit 103 which computes the moment of inertia J and mechanical parameters A-D for the combined motor and load 108-109. The calculation processing at step 407 can be performed at the rotor flux estimator and angle tracking observer unit 105 which determines the torque constant $K_T$ from the magnetic flux linkage of permanent magnets $\psi_{PM}$ and number of pole pairs pp. The calculation processing at step 407 can also be performed at the mechanical parameters calculator unit 103 which determines the moment of inertia J using the torque constant $K_T$, the maximum q-axis AC current value $i_{qACmax\_req}$, the detected phase angle $\varphi$ defined as difference between $\theta_{iqAC}$ and $\theta_{\omega rAC\_est}$, the amplitude of the AC component of the speed feedback $\omega_{rACmax\_est}$ (or alternatively, the demanded amplitude of the AC speed component $\omega_{rACmax\_req}$), and the modulated frequency $f_{iqAC}$. In addition, the calculation processing at step 407 can be performed at the mechanical parameters calculator unit 103 which determines the mechanical parameters A-D from the torque constant $K_T$, the q-axis DC reference current component $i_{qDC\_req}$, and predetermined or estimated DC rotor speed component $\omega_{rDC\_est}$ (or alternatively, the demanded DC speed component $\omega_{rDC\_req}$).

At step 408, the estimated mechanical parameters can be used to design a control system for a combined electric motor and mechanical load. The disclosed mechanical parameter estimation technique is applicable to, but not limited to, any conventional PM motor drive consisted of 3-phase, 3 legs power supply inverter equipped with 6 power switches. In addition, the estimation of the mechanical parameters does not require any position or speed sensors since only the 3-phase currents measurement and DC bus voltage are used to identify the mechanical parameters of the complete mechanical system which includes the motor and mechanical load coupled to motor. Robust to static friction, breakaway torque and cogging torque, the disclosed mechanical parameter estimation technique provides a fully autonomous estimation process without user intervention. Since almost every motor control project requires the mechanical parameters, the disclosed estimation system and process can significantly reduce development time. Also, precisely identified mechanical parameters can help guarantee the reliable and efficient motor drive operation. Mechanical parameters can be also used for modelling various motor drive conditions such as various failures, overloads, etc. Mechanical parameters can also be determined to detect failures before motor start-up.

Figure 5:
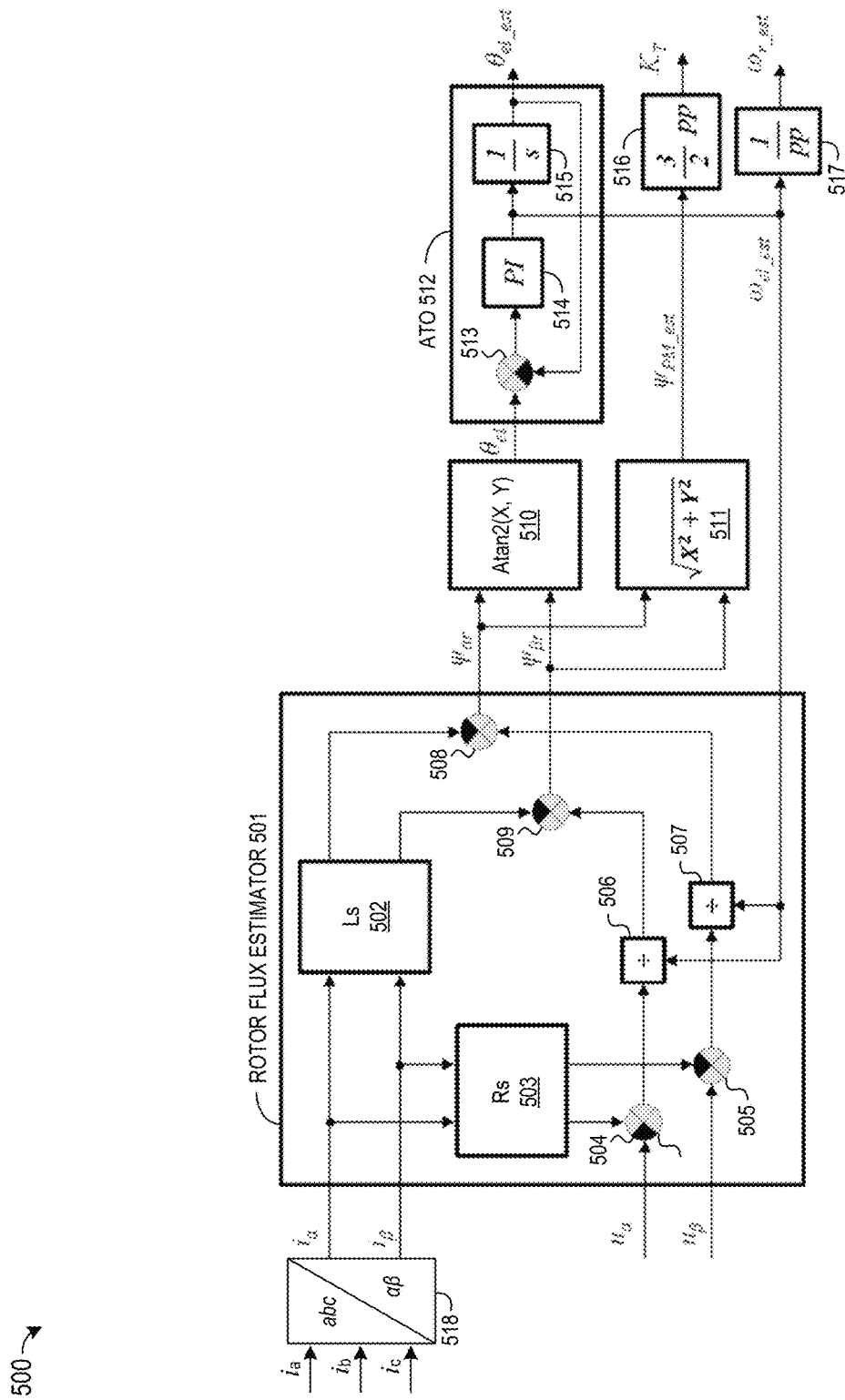
FIG. 5 is a simplified block diagram of the rotor flux estimator and angle tracking observer that may be used in the electric load drive system shown in FIG. 1 in accordance with selected embodiments of the present disclosure.

To provide additional details for an improved understanding of selected embodiments of the present disclosure, reference is now made to FIG. 5 which depicts simplified block diagram 500 of an example rotor flux estimator 501 and angle tracking observer 512 such as may be used in the electric load drive system shown in FIG. 1. In operation, the rotor flux estimator 501 and ATO 512 are connected and configured to estimate an electrical rotor position $\theta_{el\_est}$ and rotor speed $\omega_{r\_est}$ without using a position sensor. This brings a huge benefit for sensor-less applications which are not equipped with position sensor at all. In addition, the rotor flux estimator 501 is connected and configured to estimate the magnetic flux linkage of permanent magnets $\psi_{PM\_est}$, so that torque constant $K_T$ and hence amount of the electromagnetic torque $T_e$ can be determined pursuant to Equations (5) and (6).

In accordance with selected embodiments, the rotor flux estimator 501 operates in the alfa-beta reference frame where stator voltages $u_{\alpha\beta}$ and stator currents $i_{\alpha\beta}$ are input variables and where alfa-beta components of the rotor flux $\psi_{\alpha r}$, $\psi_{\beta r}$ are output variables. For example, the Parks transformation matrix 518 transforms the measured feedback currents $i_{abc}$ into the input stator currents $i_{\alpha\beta}$. Alfa-beta components of the rotor flux can be expressed by using following formulas:

$$\psi_{\alpha r} = \frac{1}{\omega_{el\_est}}(u_\beta - R_s i_\beta) - L_s i_\alpha \quad (14)$$

$$\psi_{\beta r} = \frac{1}{\omega_{el\_est}}(-u_\alpha + R_s i_\alpha) - L_s i_\beta \quad (15)$$

where $R_s$ is the stator resistance and $L_s$ is the stator inductance. To this end, the rotor flux estimator 501 includes a first $L_s$ generator circuit 502 which is connected and configured to multiply the stator inductance $L_s$ with the input stator currents $i_\alpha$, $i_\beta$ for output, respectively, to the subtraction circuits 508, 509. In addition, the rotor flux estimator 501 includes a second $R_s$ generator circuit 503 which is connected and configured to multiply the stator resistance $R_s$ with the input stator currents $i_\alpha$, $i_\beta$ for output, respectively, to the subtraction circuits 504, 505 where the input stator voltages $u_\alpha$, $u_\beta$ are combined as indicated. In turn, the outputs from the subtraction circuits 504, 505 are provided, respectively, to the divider circuits 506, 507 where they are divided by the estimated electrical rotor speed $\omega_{el\_est}$ before being output, respectively, to the subtraction circuits 509, 508 which generate the output rotor flux variables $\psi_{\alpha r}$, $\psi_{\beta r}$.

The rotor flux outputs $\psi_{\alpha r}$, $\psi_{\beta r}$ of the flux estimator 501 are processed at the Atan2 circuit 510 to calculate the electrical rotor position $\theta_{el}$ by returning the angle between the ray to the point (x, y) and the positive x axis:

$$\theta_{el}=\text{Atan2}(\psi_{\beta r}/\psi_{\alpha r}) \quad (16)$$

In addition, the rotor flux outputs $\psi_{\alpha r}$, $\psi_{\beta r}$ are processed at the magnetic flux linkage circuit 511 which calculates the magnetic flux linkage of the permanent magnets $\psi_{PM\_est}$:

$$\psi_{PM\_est} = \psi_{rmax} = \sqrt{\psi_{\alpha r}^2 + \psi_{\beta r}^2} \quad (17)$$

In addition, the estimated magnetic flux linkage $\psi_{PM\_est}$ is provided to the multiplication circuit 516 which calculates the torque constant $K_T=3/2\cdot pp\cdot\psi_{PM\_est}$.

In selected embodiments, the electrical rotor speed $\omega_{el\_est}$ can be calculated as a derivation of the rotor position. In other embodiments, an angle tracking observer (ATO) circuit may be used to provide a filtering function of the speed. For example, the depicted ATO 512 is a closed loop system which tracks the real electrical rotor position $\theta_{el}$ by keeping to zero the error between the observed position $\theta_{el}$ provided by the rotor flux estimator 501 and the estimated rotor position $\theta_{el\_est}$ provided by the ATO 512. This condition is satisfied when PI controller 514 generates the correct rotor speed $\omega_{el\_est}$ and when the output $\theta_{el\_est}$ of the integrator 515 matches the real rotor position $\theta_{el}$. At the depicted ATO 512, the output of the PI controller 514 is the electrical speed $\omega_{el\_est}$ which is provided to the division circuit 517 which calculates the mechanical speed $\omega_{r\_est}=\omega_{el\_est}/pp$, where pp is the number of pole pairs.

As disclosed herein, the outputs of the rotor flux estimator 501 and ATO 512 are distributed across the entire system. For example, the torque constant $K_T$ is used at the mechanical parameters calculation unit 103 to compute the mechanical parameters. In addition, the estimated rotor speed $\omega_{r\_est}$ is provided to speed demodulator 106 for independent AC and DC speed control. In addition, the estimated rotor position $\theta_{el\_est}$ is provided to FOC current loop unit 104.

While any suitable FOC current loop unit may be used, selected embodiments of the present disclosure may use the FOC current loop 211-219 shown in FIG. 2 to generate the reference voltages $u_{\alpha\beta\_req}$ and corresponding duty cycles $PWM_{a,b,c}$ from the measured feedback current $i_{abc}$ and from the estimated rotor position $\theta_{el\_est}$ provided by rotor flux estimator and ATO 105. In such embodiments, the $K_p$ and $K_i$ parameters of the PI controllers 212, 214 may be designed using the pole placement method which requires that the electrical parameters ($R_s$, $L_d$, $L_q$) be known or computed using any suitable method, such as described in U.S. patent application Ser. No. 17/125,771 entitled "Apparatus And Method For Determining Electrical Characteristics Of An Electronic Motor" which was filed on Dec. 17, 2020.

As disclosed herein, the FOC current loop unit plays a role of current-to-torque converter or torque generator in the mechanical parameter estimation process since the q-axis current component is directly proportional to torque if the d-axis current component is kept zero. As a result and as shown in Equation (5), the q-axis current component $i_q$ controls the acceleration/deacceleration of the motor as well as excitation of the mechanical system which includes the motor and load. As detailed below, this condition can be employed to determine all parameters of the mechanical Equation (4).

Firstly, it will be appreciated that, in the steady state condition, the derivation of the speed equals zero, and the torque of the mechanical load is balanced by electromagnetic torque $T_e$ created by corresponding q-axis current $i_q$. Therefore, at steady state condition, Equation (4) can be rewritten to following form:

$$T_e=K_T i_q=\text{sign}(\omega_r)\cdot(A+B|\omega_r|+C|\omega_r|^2+D|\omega_r|^3) \quad (18)$$

Next, Equation (18) can be solved numerically as linear system of four equations with four unknowns to compute all of the parameters (A, B, C, D) of the mechanical system at steady state condition:

$$T_{e1} = K_T \cdot i_{q1} = A + B\omega_{r1} + C\omega_{r1}^2 + D\omega_{r1}^3$$

$$T_{e2} = K_T \cdot i_{q2} = A + B\omega_{r2} + C\omega_{r2}^2 + D\omega_{r2}^3$$

$$T_{e3} = K_T \cdot i_{q3} = A + B\omega_{r3} + C\omega_{r3}^2 + D\omega_{r3}^3$$

$$T_{e4} = K_T \cdot i_{q4} = A + B\omega_{r4} + C\omega_{r4}^2 + D\omega_{r4}^3 \quad (19)$$

Next, the system of equations in Equation (19) can be expressed using matrix form:

$$\begin{bmatrix} T_{e1} \\ T_{e2} \\ T_{e3} \\ T_{e4} \end{bmatrix} = K_T \begin{bmatrix} i_{q1} \\ i_{q2} \\ i_{q3} \\ i_{q4} \end{bmatrix} = \begin{bmatrix} 1 & \omega_{r1} & \omega_{r1}^2 & \omega_{r1}^3 \\ 1 & \omega_{r2} & \omega_{r2}^2 & \omega_{r2}^3 \\ 1 & \omega_{r3} & \omega_{r3}^2 & \omega_{r3}^3 \\ 1 & \omega_{r4} & \omega_{r4}^2 & \omega_{r4}^3 \end{bmatrix} \begin{bmatrix} A \\ B \\ C \\ D \end{bmatrix} \quad (20)$$

For purposes of simplification, the matrix form in Equation (20) can be expressed with the following matrix notation:

$$T = K_T I_q = W_r \cdot X \quad (21)$$

where $T_e$ is the matrix of predetermined electromagnetic torque variable values, where $W_r$ is the matrix of predetermined rotor speed variable values, and where X is the matrix of mechanical parameter values.

To solve the parameters of the X matrix, the following equation must be solved:

$$X = W_r^{-1} \cdot T_e = W_r^{-1} \cdot K_T I_q \quad (22)$$

Figure 6:
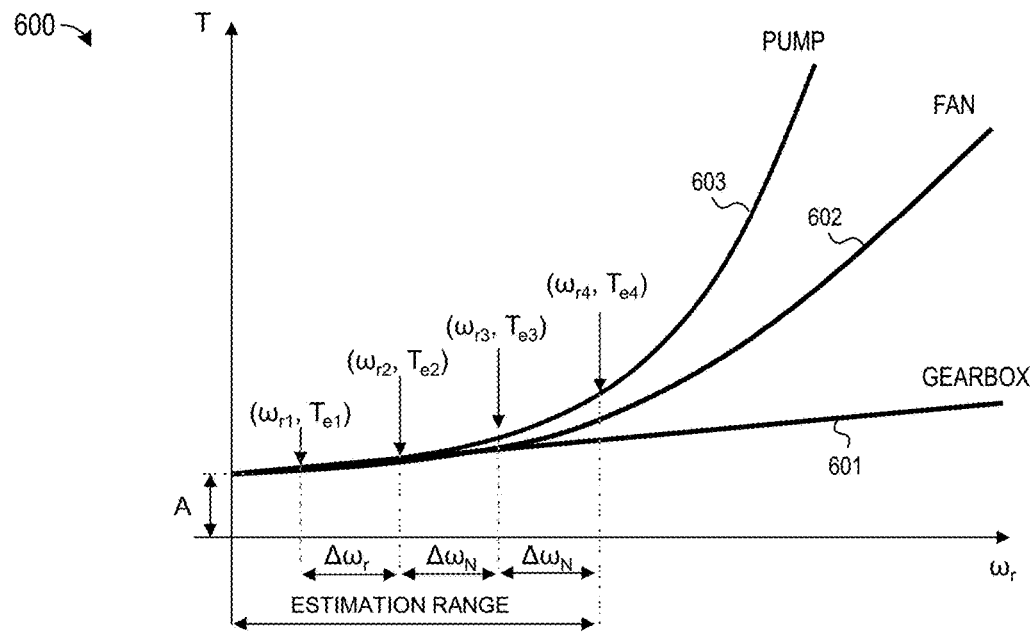
FIG. 6 shows torque-speed characteristic of various mechanical loads at steady state conditions with a plurality of associated electromagnetic torque and mechanical speed variable pairings ($T_{ei}$, $\omega_{ri}$) in accordance with selected embodiments of the present disclosure.

To solve Equation (22) and obtain the mechanical parameters of the matrix X, the system of four equations requires four known variables of the torque ($T_{e1}$, $T_{e2}$, $T_{e3}$, $T_{e4}$) and four known variables of the speed ($\omega_{r1}$, $\omega_{r2}$, $\omega_{r3}$, $\omega_{r4}$). While any suitable approach may be used to find the torque and speed variables, reference is now made to FIG. 6 depicts a plot 600 of torque-speed characteristics 601-603 of various mechanical loads at steady state conditions. As depicted, the substantially linear torque-speed characteristic 601 for the gearbox load has a plurality of torque-speed variable pair values ($\omega_{r1}$, $T_{e1}$), ($\omega_{r2}$, $T_{e2}$), ($\omega_{r3}$, $T_{e3}$), ($\omega_{r4}$, $T_{e4}$) uniformly distributed over the rotor speed estimation range 604. In similar fashion, the quadratic torque-speed characteristic 602 for the fan load has a plurality of torque-speed variable pair values ($\omega_{r1}$, $T_{e1}$), ($\omega_{r2}$, $T_{e2}$), ($\omega_{r3}$, $T_{e3}$), ($\omega_{r4}$, $T_{e4}$) uniformly distributed over the rotor speed estimation range 604. Finally, the cubic torque-speed characteristic 603 for the pump load has a plurality of torque-speed variable pair values ($\omega_{r1}$, $T_{e1}$), ($\omega_{r2}$, $T_{e2}$), ($\omega_{r3}$, $T_{e3}$), ($\omega_{r4}$, $T_{e4}$) uniformly distributed over the rotor speed estimation range 604. To improve the precision of parameter estimation, the rotor speed variables ($\omega_{r1}$, $\omega_{r2}$, $\omega_{r3}$, $\omega_{r4}$) should be distributed evenly along the torque-speed characteristic with a predefined step or interval $\Delta\omega_r$ within predefined safety estimation range 604. Normally, an estimation speed range from 10% up to 50% of the nominal speed $n_N$ should be sufficient to define all parameters. However, it will be appreciated that higher estimation ranges will result in higher precision of the torque-speed curve mapping.

As disclosed herein, the mechanical parameters A, B, C, D of the matrix X represent the complete mechanical system for all potential motor and load combinations, meaning that higher order parameters are not present with lower order loads. For example, the cubic parameter D=0 for a quadratic fan load characteristics. Similarly, the quadratic and cubic parameters equal zero (e.g., C=D=0) for linear gearbox load characteristics. As a result, if the mechanical load is known, then the number of equations and number of measurements can be reduced. For example, only two variables of the torque-speed characteristic are needed from the linear load 601 to solve for the A and B mechanical parameters.

As disclosed herein and referring back to FIG. 1, the speed modulator unit 102 and speed demodulator unit 106 may be used to control the speed step $\Delta\omega_r$ as well as speed range 604. In particular, the speed modulator unit 102 processes the demodulated DC speed feedback $\omega_{rDC\_est}$ to generate the appropriate DC q-axis current $i_{qDC\_req}$ that is proportional to electromagnetic torque that balances condition of Equation (18) at each position of the torque-speed characteristic shown in FIG. 6. As a result, Equation (18) can be rewritten to following form:

$$T_{eDC} = K_T \cdot i_{qDC} = \text{Sign}(\omega_{rDC}) \cdot (A + B|\omega_{rDC}| + C|\omega_{rDC}|^2 + D|\omega_{rDC}|^3) \quad (23)$$

Referring back to Equation (4), the final mechanical parameter to be identified is moment of inertia J. As will be appreciated, the moment of inertia is the most crucial parameter when designing the speed control loop, and must therefore be identified precisely.

To identify moment of inertia J, the motor must be operated at a low rotor speed that is in the linear torque-speed region to minimize the effect of the square and cube components of Equation (4). At low speeds, the contribution of these two components is very low and can therefore be neglected, allowing Equation (4) to be rewritten to following form:

$$T_e = K_T \cdot i_q = J \frac{d\omega_r}{dt} + \text{sign}(\omega_r) \cdot (A + B|\omega_r|) \quad (24)$$

As shown in Equation (24), the estimation of the moment of inertia J requires high frequency excitation to amplify effect of the J parameter in the speed feedback. To this end, an excitation torque $T_{eAC}$ can be generated by the alternating q-axis current $i_{qAC}$ with some amplitude $i_{qACmax}$ and some frequency $f_{AC}$ as stated below:

$$T_{eAC} = T_{eACmax}\sin(2\pi f_{AC}t) = K_T \cdot i_{qAC} = K_T \cdot i_{qACmax}\sin(2\pi f_{AC}t) \quad (25)$$

$$= J\frac{d\omega_r}{dt} + \text{sign}(\omega_r) \cdot (A + B|\omega_r|)$$

However, such a simple AC excitation would cause a speed reversal which is undesirable for a number of reasons. First, the estimation accuracy might be affected by static or coulomb friction represented by parameter A and cogging torque at a speed that is close to zero. Second, the rotor flux estimator unit can only operate effectively at a certain minimum speed. These drawbacks can be overcome by generating the excitation torque $T_{eAC}$ with both DC and AC excitation:

$$T_{eDC+AC} = T_{eDC} + T_{eACmax}\sin(2\pi f_{AC}t) = \quad (26)$$

$$K_T \cdot i_{qDC+AC} = K_T(i_{qDC} + i_{qACmax}\sin(2\pi f_{AC}t))$$

$$= J\frac{d\omega_r}{dt} + \text{sign}(\omega_r) \cdot (A + B|\omega_r|)$$

In the case where the motor is operated at a certain point of the torque-speed characteristic, then at steady state conditions, the load torque is balanced by corresponding electromagnetic torque by means of DC q-axis current $i_{qDC}$. A small AC q-axis component $i_{qAC}$ can be modulated on top of the DC q-axis current $i_{qDC}$ to produce a corresponding AC and DC excitation torque $T_{eDC+AC}$. The response to that excitation is speech feedback from the speed demodulator that contains AC and DC components $\omega_{rDC+AC}$:

$$\omega_{rDC+AC} = \omega_{rDC} + \omega_{rAC} = \frac{T_{eDC} - A}{B} + \frac{T_{eACmax}}{\sqrt{B^2 + (2\pi f_{AC} J)^2}} \sin(2\pi f_{AC} t - \varphi) \quad (27)$$

$$= \frac{K_T i_{qDC} - A}{B} + \frac{K_T i_{qACmax}}{\sqrt{B^2 + (2\pi f_{AC} J)^2}} \sin(2\pi f_{AC} t - \varphi)$$

Equation (27) reveals that the static friction A does not affect AC component and only affects the DC component. As a result, the modulated AC component of the speed can be used to determine moment of inertia J using following expression:

$$J = \frac{1}{2\pi f_{AC}} \frac{T_{eACmax}}{\omega_{rACmax}} \sin(\varphi) = \frac{1}{2\pi f_{AC}} \frac{K_T i_{qACmax}}{\omega_{rACmax}} \sin(\varphi) \quad (28)$$

where $\omega_{rACmax}$ is an amplitude of the AC component of the speed feedback, where $\varphi$ is phase shift between alternating torque $T_{eAC}$ and speed feedback $\omega_{rAC}$, and where $f_{AC}$ is the modulated frequency.

In order to avoid effect of the breakaway torque or static friction and cogging torque, the DC component of the speed feedback must be always higher than the amplitude of the AC component (e.g., $\omega_{rDC} > \omega_{rACmax}$) However, it is difficult to control the speed response by using the q-axis current since the load (and therefore the speed response) is not known. To address this control problem, the speed modulator and demodulator are used in the parameter estimation process to independently control DC and AC component of the rotor speed to satisfy the $\omega_{rDC} > \omega_{rACmax}$ requirement. In particular, the speed demodulator 106 is configured to generate demodulated DC and AC speed components $\omega_{rDC\_est}$, $\omega_{rACmax\_est}$ from the speed feedback $\omega_{r\_est}$ provided by the rotor flux estimator 105 for supply to the speed modulator unit 102 and mechanical parameters calculation unit 103. In addition, the speed modulator 102 is configured to modulate the DC and AC speed components $\omega_{rDC\_est}$, $\omega_{rACmax\_est}$ to control the speed step $\Delta\omega_r$ and speed range and to meet the condition $\omega_{rDC} > \omega_{rACmax}$. At the mechanical parameters calculation unit 103, the demodulated DC speed component $\omega_{rDC\_est}$ is used to solve Equation (22) when calculating the mechanical parameters A, B, C, D parameters of the X matrix. In addition, the mechanical parameters calculation unit 103 uses the demodulated AC speed component $\omega_{rACmax\_est}$ and the phase shift angle calculated as difference between phase angle $\theta_{iqAC}$ of the desired or requested AC q-axis current component and estimated phase angle $\theta_{\omega rAC\_est}$ to solve Equation (28) to compute the moment of inertia J.

Figure 7:
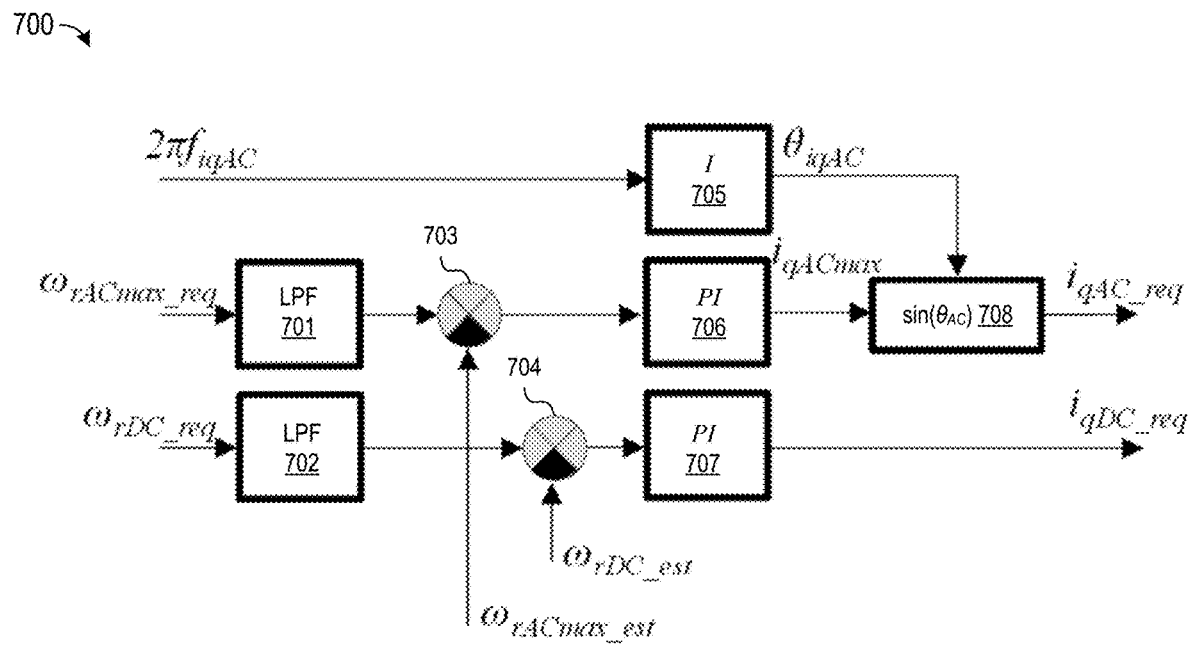
FIG. 7 is a simplified block diagram of the signal modulator that may be used in the electric load drive system shown in FIG. 1 in accordance with selected embodiments of the present disclosure.

To provide additional details for an improved understanding of selected embodiments of the present disclosure, reference is now made to FIG. 7 which depicts simplified block diagram 700 of an example signal modulator 701-708 such as may be used in the electric load drive system shown in FIG. 1. This structure is based on the two PI-controllers 707, 706 that maintain independent control, respectively, of the DC rotor speed component $\omega_{rDC\_req}$ and AC rotor speed component $\omega_{rAC\_req}$ at desired magnitude $\omega_{rACmax\_req}$ and frequency $f_{AC}$.

A combination of PI integral controllers 706, 707 and low pass filters 701, 702 placed in the feedforward path can be used to control the stability of electric load drive system. PI controllers 706, 707 can maintain independent control of the desired or requested DC rotor speed component $\omega_{rDC\_req}$ and AC rotor speed component at the desired magnitude $\omega_{rACmax\_req}$. Low pass filter 701 receives the AC rotor speed component at the desired magnitude $\omega_{rACmax\_req}$ as an input and provides a filtered AC rotor speed component at the desired magnitude $\omega_{rACmax\_req}$ to the summation circuit 703. The estimated maximum AC rotor speed $\omega_{rACmax\_est}$ is subtracted from the filtered AC rotor speed component at desired magnitude by summation circuit 703. The output of summation circuit 703 is provided to the input of PI controller 706. The output of PI controller 706 is the amplitude of AC current $i_{qACmax}$ that can be provided to the sine circuit 708 to determine the reference AC current $i_{qAC\_req}$.

In similar fashion, the low pass filter 702 receives the desired or required DC rotor speed component $\omega_{rDC\_req}$ and provides a filtered DC speed component to the summation circuit 704. The estimated DC rotor speed $\omega_{rDC\_est}$ is subtracted from the filtered required DC rotor speed $\omega_{rDC\_req}$. The output of summation circuit 704 is provided to the input of PI controller 707. The output of PI controller 707 is the reference DC current $i_{qDC\_req}$.

In addition, the electrical phase of the modulated AC voltage signal $\theta_{iqAC}$ is generated by providing the angular frequency $2\pi f_{oc}$ to an input of the integrator 705. The output of integrator 705 is the phase angle of the modulated AC voltage phase signal $\theta_{iqAC}$ and is provided to sine circuit 708, which multiplies the maximum AC current, $i_{qAC\_max}$, output from PI controller 706 by the sine of the phase angle $\theta_{iqAC}$ to determine the AC current $i_{qAC\_req}$.

Figure 8:
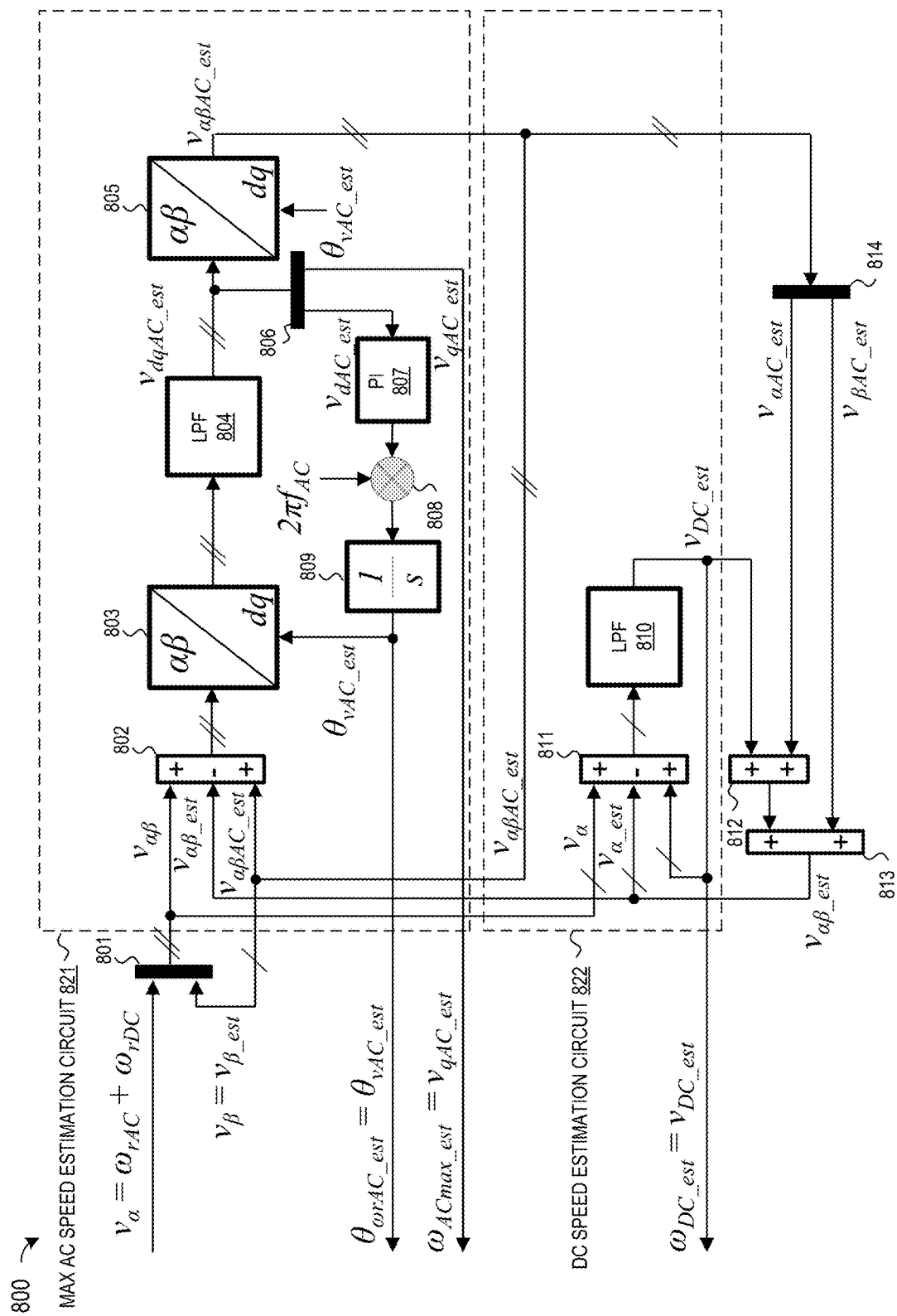
FIG. 8 is a simplified block diagram of the signal demodulator that may be used in the electric load drive system shown in FIG. 1 in accordance with selected embodiments of the present disclosure.

To provide additional details for an improved understanding of selected embodiments of the present disclosure, reference is now made to FIG. 8 which depicts simplified block diagram of an example speed signal demodulator 800 such as may be used in the electric load drive system shown in FIG. 1. Speed signal demodulator 800 can include maximum AC rotor speed estimation circuit 821 and DC rotor speed estimation circuit 822 to demodulate both AC and DC speed component estimates. Some advantages of isolating the DC speed component from the AC speed component includes being able to control the AC and DC speeds separately, and also using the components to determine the mechanical parameters of the electric motor and load.

As depicted, the speed signal demodulator 800 is based on the phase lock loop (PLL) structure whose main purpose is to detect and output the phase angle $\theta_{vAC\_est}$ of the AC signal that is input to both of the Parks transformation matrixes 803 and 805. The estimated rotor speed $\omega_{r\_est}$ that is provided by the rotor flux estimator is input alfa component $v_\alpha$ to the signal mux circuit 801 at the PLL structure. The signal mux circuit 801 also receives the input beta component $v_\beta$ that is generated internally by the PLL algorithm at the maximum AC rotor speed estimation circuit 821. Thus, the signal mux circuit 801 receives two inputs $v_\alpha$, $v_\beta$ and produces one output that is a combination of the two inputs. All lines which are crossed by short two lines represents either a 2-phase DC (dq) system or 2-phase AC ($\alpha\beta$) system. The output of signal mux circuit 801 is provided as an input to summation circuit 802.

At the summation circuit 802, the estimated alfa-beta components $V_{\alpha\beta\_est}$ are subtracted from input alfa-beta components $v_{\alpha\beta}$ to have a decoupled AC and DC system. This may be implemented by connecting a non-negating input of the summation circuit 802 to the output of signal mux circuit 801, connecting a negating input to receive the estimated alfa-beta components $V_{\alpha\beta\_est}$ from the output of summation circuit 813, and connecting a non-negating input to the output of the dq/αβ inverse Park transformation circuit 805. Summation circuit 802 has a multi-output line coupled to an input of αβ/dq transformation circuit 803 which transforms the decoupled estimated alfa-beta components of the AC signal $V_{\alpha\beta AC\_est}$ output from summation circuit 802 into speed components in the d and q axes. Low pass filter 804 receives the speed components in the d and q axes from αβ/dq transformation circuit 803 and passes signals with a frequency lower than a selected cut-off frequency while attenuating signals with frequencies higher than the cut-off frequency.

The αβ/dq transformation circuit 803 and dq/αβ inverse Park transformation circuit 805 can be implemented using a Park transform that converts time-domain components of a two-phase system in an alpha/beta reference frame to direct, quadrature components in a rotating reference frame, and vice versa. Each of the transformation circuits 803, 805 is controlled by a phase angle $\theta_{vAC\_est}$ that can be detected by controlling fictitious d-axis component $V_{dAC\_est}$ to zero.

The output of low pass filter 804, which includes estimated dq components of the test AC speed signal, is provided to dq/αβ inverse Park transformation circuit 805 and signal demux circuit 806. The estimated d component of the test AC speed signal $V_{dAC\_est}$ generated by the signal demux circuit 806 is provided to proportional-integral (PI) controller 807. In addition, the estimated q component of the test AC speed signal $v_{qAC\_est}$ generated by the signal demux circuit 806 (a.k.a., the estimated amplitude of AC speed) is provided to the speed signal modulator 102 as a feedback signal for AC speed control.

The estimated d component of the test AC speed signal $V_{dAC\_est}$ generated by the signal demux circuit 806 is provided to the proportional-integral (PI) controller 807 as an error. This error is suppressed when the PI controller 807 generates the right frequency and phase angle of the investigated AC speed signal by generating a compensation signal that is added to angular frequency of the modulation signal $2\pi_{iqAC}$. At the adder circuit 808, the frequency of the AC signal is obtained as a sum of output from the PI controller 807 and the feedforward frequency $2\pi f_{AC}$. And at the integrator 809, the phase angle of the AC signal is generated by integrating the frequency of the AC signal. The phase angle of the estimated AC current $\theta_{vAC\_est}$ is provided to both the αβ/dq transformation circuit 803 and the dq/αβ inverse Park transformation circuit 805. Since the d component is zero, the q component constitutes the amplitude of the estimated AC speed signal $V_{qAC\_est}=\omega_{ACmax\_est}$. The q component of the estimated AC speed signal is provided to the speed signal modulation circuit 102.

The dq/αβ inverse Park transformation circuit 805 receives the estimated AC phase angle $\theta_{vAC\_est}$ output by the integrator 809 and transforms the output of low pass filter 804 to generate an estimate of AC speed in the alpha/beta coordinate system, in which the beta component is shifted 90 degrees from the alpha component. The output of dq/αβ inverse Park transformation circuit 805 is provided to a non-negating input of summation circuit 802 and demux circuit 814.

At the DC speed estimation circuit 822, the decoupled DC component $v_{DC}$ is filtered by a low pass filter 810 to generate the filtered DC component $V_{DC\_est}$ which is added with the estimated alfa component $v_{\alpha\_st}$ at the summation circuit 812 to compute the estimated alfa-beta system of the input signal $V_{\alpha\beta\_est}$. In addition, the DC rotor speed estimation circuit 822 may include a summation circuit 811 which includes a non-negating input coupled to receive the output of signal mux circuit 801, which are the real AC and DC speeds $v_\alpha$. A negating input of summation circuit 811 is coupled to receive the $v_{\alpha\_est}$ output of summation circuit 813, and a second non-negating input of summation circuit 811 is coupled to receive the output of low pass filter 810, which is the estimated DC speed component $V_{DC\_est}$. The summation circuit 812 sums two inputs provided at a first non-negating input (which is coupled to receive the estimated DC speed component $v_{DC\_est}$ output by the low pass filter 810) and a second non-negating input (which is coupled to the demultiplexer 814 to receive the alpha component $v_{\alpha AC\_est}$ of the dq/αβ transformation circuit 805). The summation circuit 813 sums two inputs provided at a first non-negating input (which is coupled to receive the sum from the summation circuit 812) and a second non-negating input (which is coupled to the demultiplexer 814 to receive the estimated beta component $v_{\beta AC\_est}$ of the dq/αβ transformation circuit 805). The output of summation circuit 813 is provided to the negating input of summation circuits 802 and 811. The output of low pass filter 810 is the estimated DC speed $V_{DC\_est}$ that can be provided as feedback to summation circuit 812.

At steady state conditions, input alpha-beta components $v_{\alpha\beta}$ are equal to the estimated alfa-beta components $v_{\alpha\beta\_est}$, and the estimated phase angle $\theta_{vAC\_est}$ tracks the phase angle of the AC component of the rotor speed $\theta_{\omega rAC\_est}$ (e.g., $\theta_{vAC\_est}=\theta_{\omega rAC\_est}$). In addition, the estimated DC component $v_{DC\_est}$ represents the DC component of the speed ωrDC_est (e.g., $\omega_{rDC\_est}=v_{DC\_est}$) Also, the fictitious q component of the AC signal $v_{qAC\_est}$ represents the amplitude of the AC component of the speed $\omega_{rACmax\_est}$ (e.g., $\omega_{rACmax\_est}=v_{qAC\_est}$). These variables are provided to the speed signal modulator 102 and to the mechanical parameters calculation unit 103.

Referring back to FIG. 1, the mechanical parameters calculation unit 103 is connected to receive all required signal information to solve the mechanical parameters A-D using Equation (22), and to solve the combined moment of inertia parameter J using Equation (28). In particular, the four rotor speed demands ($\omega_{rDC\_req1}$, $\omega_{rDC\_req2}$, $\omega_{rDC\_req3}$, $\omega_{rDC\_req4}$) can be set by speed modulator unit 102 in order to determine the A, B, C, D parameters of the X matrix in Equation (22). In addition, the speed modulator unit 102 can provide the corresponding torque levels from four demands of the q-axis current ($i_{qDC\_req1}$, $i_{qDC\_reg2}$, $i_{qDC\_req3}$, $i_{qDC\_req4}$). Finally, the rotor flux estimator and ATO unit 105 can provide the torque constant $K_T$. Estimated DC speed components ($\omega_{rDC\_est1}$, $\omega_{rDC\_est2}$, $\omega_{rDC\_est3}$, $\omega_{=rDC\_est4}$) can be used to solve Equation (22) as depicted in FIG. 1, however, A, B, C, D parameters calculation is less affected by noise with matrix $W_r^{-1}$ populated by demanded DC speed components ($\omega_{rDC\_req1}$, $\omega_{rDC\_req2}$, $\omega_{rDC\_req3}$, $\omega_{rDC\_req4}$). At steady state conditions, demanded speed equals estimated speed. Based on this, the Equation (22) may be rewritten as:

$$\begin{bmatrix} T_{eDC\_req1} \\ T_{eDC\_req2} \\ T_{eDC\_req3} \\ T_{eDC\_req4} \end{bmatrix} = \quad (29)$$

$$K_T \begin{bmatrix} i_{qDC\_req1} \\ i_{qDC\_req2} \\ i_{qDC\_req3} \\ i_{qDC\_req4} \end{bmatrix} = \begin{bmatrix} 1 & \omega_{rDC\_req1} & \omega^2_{rDC\_req1} & \omega^3_{rDC1\_req1} \\ 1 & \omega_{rDC\_req2} & \omega^2_{rDC\_req2} & \omega^3_{rDC2\_req2} \\ 1 & \omega_{rDC\_req3} & \omega^2_{rDC\_req3} & \omega^3_{rDC3\_req3} \\ 1 & \omega_{rDC\_req4} & \omega^2_{rDC\_req4} & \omega^3_{rDC4\_req4} \end{bmatrix} \begin{bmatrix} A \\ B \\ C \\ D \end{bmatrix}$$

Based on these inputs, the mechanical parameters calculation unit 103 may use a vector processor or accelerator hardware to obtain the parameters of the X matrix by solving following equation:

$$X = W_{rDC\_req}^{-1} \cdot T_{eDC\_req} = W_{rDC\_req}^{-1} \cdot K_T \cdot I_{qDC\_req}. \quad (30)$$

The mechanical parameters calculation unit 103 may also determine the estimated moment of inertia $J_{est}$ by setting one AC speed demand $\omega_{rACmax\_req}$ with the lowest speed demand $\omega_{rDC\_req1}$ using the equation:

$$J_{est} = \quad (31)$$
$$\frac{1}{2\pi f_{iqAC}} \cdot \frac{T_{eACmax}}{\omega_{rACmax}} \sin(\varphi) = \frac{1}{2\pi f_{iqAC}} \cdot \frac{K_T i_{qACmax\_req}}{\omega_{rACmax\_req}} \sin(\theta_{iqAC} - \theta_{\omega rAC\_est}).$$

In support of computing the estimated moment of inertia $J_{est}$, the mechanical parameters calculation unit 103 is connected to receive the torque constant $K_T$ from the rotor flux estimator 103. In addition, the mechanical parameters calculation unit 103 is connected to receive the estimated phase angle $\theta_{\omega rAC\_est}$ from the speed demodulator 106. In addition, the mechanical parameters calculation unit 103 may be connected to receive either the estimated maximum AC rotor speed $\omega_{rACmax\_est}$ from the speed demodulator 106 or the demanded maximum AC rotor speed $\omega_{rACmax\_req}$ from the speed modulator 102. At steady state conditions, demanded maximum AC rotor speed $\omega_{rACmax\_req}$ equals estimated maximum AC rotor speed $\omega_{rACmax\_est}$. J calculation is less affected by noise with demanded maximum AC rotor speed $\omega_{rACmax\_req}$. The mechanical parameters calculation unit 103 is also connected to receive from the speed modulator 102 the required DC component of the q-axis current $i_{qDC\_req}$ and the required AC component of the q-axis current $i_{qAC\_req}$ which effectively conveys the required amplitude $i_{qACmax\_req}$ and phase angle $\theta_{iqAC}$ of the AC component of the q-axis current. As disclosed herein, the identification processes performed by the speed modulator 102 and demodulator 106 can be fully autonomous.

By now it should be appreciated that there is provided herein a method, apparatus, and system for determining mechanical characteristics of an electric motor and mechanical load. The disclosed system includes a speed signal modulation circuit, an FOC current loop circuit, a sensor-less rotor speed estimator circuit, a speed signal demodulation circuit, and mechanical characteristics estimation circuit. The disclosed speed signal modulation circuit includes a first PI controller configured to control a q-axis AC reference current based on a requested maximum AC rotor speed and an estimated maximum AC rotor speed, and also includes a second PI controller configured to control a q-axis DC reference current based on a requested DC rotor speed and an estimated DC rotor speed. The disclosed FOC current loop circuit is configured to generate AC and DC reference voltages in response to the q-axis AC reference current and q-axis DC reference current under control of an estimated electrical rotor position and measured feedback currents detected at the electric motor, wherein a d-axis reference current is set to zero. In selected embodiments, the FOC current loop circuit includes a direct-current (d-current) control block, a quadrature-current (q-current) control block, an inverse Park transformation block, a space vector modulation block, a voltage supply inverter (VSI) block, a Clarke transformation block, and a Park transformation block connected to controlling magnetizing and torque-producing components of the stator current in the electric motor. The disclosed sensor-less rotor speed estimator circuit is configured to generate an estimated rotor position angle, estimated rotor speed, and torque constant in response to the AC and DC reference voltages and measured feedback currents detected at the electric motor. In selected embodiments, the sensor-less rotor speed estimator circuit includes a rotor flux estimator block and angle tracking observer block which are connected to receive the measured feedback currents and the reference voltages and to generate the estimated rotor angle position, estimated rotor speed, and torque constant. The disclosed speed signal demodulation circuit includes an AC rotor speed estimation circuit configured to generate the estimated maximum AC rotor speed from the estimated rotor speed, a DC rotor speed estimation circuit configured to generate the estimated DC rotor speed from the estimated rotor speed; and a phase angle detection circuit configured to generate a phase angle measure of the AC rotor speed. The mechanical characteristics estimation circuit is configured to determine a plurality of load torque parameters for the electric motor and mechanical load based on the q-axis AC reference current, q-axis DC reference current, a maximum AC rotor speed component (which may be estimated or demanded), a DC rotor speed component (which may be estimated or demanded), phase angle measure of the AC rotor speed, and torque constant, where the plurality of load torque parameters includes a combined moment of inertia parameter, a combined static friction parameter A, a combined viscous friction parameter B, and one or more mechanical parameters representing one or more load characteristics (e.g., a mechanical parameter C representing a fan characteristic load that is proportional to a square of a fan rotational speed and/or a mechanical parameter D representing a pump characteristic load that is proportional to a cube of a pump rotational speed). In selected embodiments, the mechanical characteristics estimation circuit is configured to determine the combined static friction parameter A, combined viscous friction t parameter B, the mechanical parameter C, and the mechanical parameter D in a parameter matrix X by solving a matrix equation $X = W_{rDC}^{-1} \cdot K_T \cdot I_{qDC\_req}$, where $W_{rDC}^{-1}$ is a precalculated inverted speed matrix including a plurality of rotor speed values, where $i_{qDC\_req}$ is a precalculated q-axis current demand matrix including a plurality of q-axis DC reference current values, where $K_T$ is the torque constant. In other embodiments, the mechanical characteristics estimation circuit is configured to determine the combined moment of inertia parameter based on the torque constant provided by the sensor-less rotor speed estimator circuit, the phase angle measure of the AC rotor speed and estimated maximum AC rotor speed provided by the speed signal demodulation circuit, and the amplitude of the AC q-axis current provided by speed signal modulator circuit. In selected embodiments, the electric motor is a 3-phase permanent magnet motor or a DC permanent magnet motor, and the mechanical load is a gearbox load, a fan load, or a pump load. In such embodiments, the system also includes a voltage supply inverter circuit configured to receive the AC and DC reference voltages and corresponding duty cycles from the FOC current loop circuit and provide real AC and DC voltages to the 3-phase permanent magnet motor. In addition, the 3-phase permanent magnet motor may be connected to provide the measured feedback currents to the FOC current loop circuit and sensor-less rotor speed estimator circuit.

In another form, there is provided a method and apparatus for determining mechanical parameters of an electric motor and mechanical load. In selected embodiments, the electric motor is a 3-phase permanent magnet motor or a DC permanent magnet motor. In addition, the mechanical load may be selected from a group consisting of a gearbox-type load, a fan-type load, and a pump-type load. In the disclosed method, the electric motor is started in an open loop by providing reference voltages to the electric motor that are sufficient to generate a predetermined minimum rotor speed at the electric motor. Once the electric motor obtains sufficient rotor speed for reliable rotor flux estimator operation, a speed modulator unit, FOC current loop unit, rotor flux estimator unit, angle tracking observer unit, and speed demodulator unit are activated to initiate a mechanical parameter estimation process in a closed loop. The disclosed method also generates an estimated rotor position, estimated rotor speed, and estimated torque constant with the rotor flux estimator unit and the angle tracking observer unit based on the reference voltages and current feedback measurements from the electric motor. In addition, the speed demodulator unit demodulates the estimated rotor speed into estimated AC and DC rotor speed components at the speed demodulator unit. In addition, the speed modulator unit modulates AC and DC current reference values $i_{qDC\_req}+i_{iqAC\_req}$ to excite the electric motor and mechanical load by corresponding AC and DC torque components based on the demanded DC and AC speed components $\omega_{rDC\_req}$, $\omega_{rACmax\_req}$ and the estimated DC and AC speed components $\omega_{rDC\_est}$, $\omega_{rACmax\_est}$. In selected embodiments, the FOC current loop unit may generate reference voltages for a voltage supply inverter based on the estimated rotor position, AC and DC current reference values, and current feedback measurements. In addition, the disclosed method estimates a plurality of load torque parameters for the electric motor and mechanical load based on the demanded AC and DC current values, phase angle of the AC current value, estimated AC and DC rotor speed components, and estimated torque constant. As disclosed, the estimated load torque parameters include a combined moment of inertia parameter J, a combined static friction parameter A, a combined viscous friction parameter B, a mechanical parameter C representing a fan characteristic load that is proportional to a square of a fan rotational speed, and mechanical parameter D representing a pump characteristic load that is proportional to a cube of a pump rotational speed. In selected embodiments, the estimation of the load torque parameters includes estimated by constructing a parameter matrix X that includes matrix values for the combined static friction parameter A, the combined viscous friction parameter B, the mechanical parameter C, and the mechanical parameter D, and then by solving a matrix equation $X=W_{rDC\_req}^{-1} \cdot K_T \cdot I_{qDC\_req}$, where $W_{rDC\_req}^{-1}$ is a precalculated inverted speed demand matrix including a plurality of rotor speed demand values, where $i_{qDC\_req}$ is a precalculated q-axis current demand matrix including a plurality of q-axis DC reference current values, where $K_T$ is the torque constant. In other embodiments, the estimation of the load torque parameters includes determining the combined moment of inertia parameter J based on the estimated torque constant, along with a phase angle measure of the AC rotor speed and estimated maximum AC rotor speed provided by the speed demodulator unit and an amplitude of the AC q-axis current provided by the speed modulator unit.

In yet another form, there is provided an apparatus, system, and method of operation for determining mechanical parameters of a combined electric motor and mechanical load. In selected embodiments, the electric motor is a 3-phase permanent magnet motor or a DC permanent magnet motor, and the mechanical load is a gearbox load, a fan load, or a pump load. The disclosed apparatus includes a speed modulator arranged to receive a nominal speed $n_N$ and to produce a q-axis AC reference current $i_{qAC\_req}$, a q-axis DC reference current $i_{qDC\_req}$, a maximum q-axis AC current value $i_{qACmax\_req}$, and a phase angle of the modulated AC voltage phase signal $\theta_{iqAC}$ under control of an estimated maximum AC rotor speed $\omega_{rACmax\_est}$ and an estimated DC rotor speed $\omega_{rDC\_est}$. The disclosed apparatus also includes a FOC having an input d-axis reference current $i_{dreq}$ set to zero and arranged to receive the q-axis AC reference current $i_{qDC\_req}$ and q-axis DC reference current $i_{qACmax\_req}$ and to produce reference voltages for a voltage supply inverter under control of an estimated electrical rotor position $\theta_{e1\_est}$ and measured feedback currents detected at the electric motor. In addition, the disclosed apparatus includes a rotor speed and angle estimator arranged to receive the reference voltages and measured feedback currents detected at the electric motor and to produce an estimated rotor speed $\omega_{r\_est}$ a, a torque constant $K_T$, and the estimated electrical rotor position $\theta_{e1\_est}$. The disclosed apparatus also includes a speed demodulator arranged to receive the estimated rotor speed $\omega_{r\_est}$ and to produce the estimated maximum AC rotor speed $\omega_{rACmax\_est}$, the estimated DC rotor speed $\omega_{rDC\_est}$, and a phase angle measure of the AC rotor speed $\theta_{\omega rAC\_est}$. In addition, the disclosed apparatus includes a mechanical parameters estimator arranged to receive the q-axis DC reference current $i_{qDC\_req}$, a maximum q-axis AC current value $i_{qACmax\_req}$, phase angle of the modulated AC voltage phase signal $\theta_{iqAC}$, estimated maximum AC rotor speed $\omega_{rACmax\_est}$, estimated DC rotor speed $\omega_{rDC\_est}$, phase angle of the AC rotor speed $\theta_{\omega rAC\_est}$, and torque constant $K_T$, and to determine a plurality of load torque parameters for the electric motor and mechanical load including a combined moment of inertia parameter J, a combined static friction parameter A, a combined viscous friction parameter B, a mechanical parameter C representing a fan characteristic load that is proportional to a square of a fan rotational speed, and mechanical parameter D representing a pump characteristic load that is proportional to a cube of a pump rotational speed. In selected embodiments, the mechanical parameters estimator is configured to determine the combined static friction parameter A, the combined viscous friction parameter B, and the mechanical parameter C in a parameter matrix X by solving a matrix equation $X=W_{rDC\_req}^{-1} \cdot K_T \cdot I_{qDC\_req}$, where $W_{rDC\_req}^{-1}$ is a precalculated inverted speed demand matrix comprising a plurality of rotor speed demand values, where $i_{qDC\_req}$ is a precalculated q-axis current demand matrix comprising a plurality of q-axis DC reference current values, where $K_T$ is the torque constant. In other embodiments, the mechanical parameters estimator is configured to determine the combined moment of inertia parameter J based on the torque constant $K_T$, the phase angle measure of the AC rotor speed $\theta_{\omega rAC\_est}$, and the estimated maximum AC rotor speed provided by the speed signal demodulation circuit, and the maximum q-axis AC current value $i_{qACmax\_req}$.

Various illustrative embodiments of the present disclosure have been described in detail with reference to the accompanying figures. While various details are set forth in the foregoing description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a sensorless 3-phase PM motor control method and apparatus without including every device feature or aspect in order to avoid limiting or obscuring the present disclosure. Such descriptions and representations are used by those skilled in the art to describe and convey the substance of their work to others skilled in the art, and the omitted details which are well known are not considered necessary to teach one skilled in the art of how to make or use the present invention.

As disclosed herein, the sensorless driven PM motor control computer product, computing device, system, method, and apparatus may include or use a FOC current loop, rotor flux estimator, angle tracking observer, and speed modulator/demodulator under control of computer program code executable on one or more central processing units or other processing devices to determine the mechanical parameters of the sensorless driven PM motor drive and load based on the specific modulation of the q-axis (torque-component) current and unique demodulation of the speed response. As such, the sensorless motor control may estimate the mechanical parameters using a technique that is robust against to breakaway torque and cogging torque and allows to determine mechanical parameters of the PM motor drive autonomously.

Because the illustrated embodiments of the present disclosure may, for the most part, be implemented using electronic components and circuits known to those skilled in the art, details will not be explained in any greater extent than that considered necessary as illustrated above, for the understanding and appreciation of the underlying concepts of the present disclosure and in order not to obfuscate or distract from the teachings of the present disclosure. In addition, the embodiments of the present disclosure may be implemented in hardware, software, firmware, or a combination thereof. When implemented in software, the hardware executing the software will use various electrical circuitry to perform the functions specified by the software. Therefore, use the term "circuit" can include electrical circuits in hardware that perform the functionally without the use of software, or circuitry in computer hardware executing software to perform the specified functionality.

A computer program, or software, for running on a computer system, at least including code portions for performing steps of a method according to the disclosure when run on a programmable apparatus, such as a computer system or enabling a programmable apparatus to perform functions of a device or system according to the disclosure. A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

The computer system may for instance include at least one processing unit, associated memory and a number of input/output (I/O) devices. When executing the computer program, the computer system processes information according to the computer program and produces resultant output information via I/O devices.

In the foregoing specification, the disclosure has been described with reference to specific examples of embodiments of the disclosure. It will, however, be evident that various modifications and changes may be made therein without departing from the broader spirit and scope of the disclosure as set forth in the appended claims.

The connections as discussed herein may be any type of connection suitable to transfer signals from or to the respective nodes, units or devices, and may include, for example, intermediate devices or busses. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials maybe reversed.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

For example, the functionality of speed modulator unit 102, mechanical parameters calculation unit 103, FOC current loop 104, rotor flux estimator and ATO 105, speed demodulator 106, and voltage supply inverter 107 of FIG. 1 may be implemented with circuits integrated into a single module or distributed amongst more than one module. Furthermore, a method according to an example embodiment of the disclosure may be implemented in a microcontroller unit. Furthermore, said method may be a stand-alone method or may form part of an initial sequence of a motor control strategy. Embodiments of the disclosure may be implemented in systems equipped with an analogue to digital conversion module for current measurement and a pulse width modulation module for voltage generation.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the speed modulator unit 102, mechanical parameters calculation unit 103, FOC current loop 104, rotor flux estimator and ATO 105, and speed demodulator 106 shown in FIG. 1 may be implemented in an integrated circuit. That is to say that the apparatus for determining the mechanical parameters of the electric drive and mechanical load may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bond wires between the pins and the dies.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in non-programmable hardware, but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems."

However, other modifications, variations and alternatives are also possible. The specifications and drawings are, accordingly, to be regarded in an illustrative rather than in a restrictive sense.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for determining mechanical characteristics of an electric motor and mechanical load, comprising:
a speed signal modulation circuit comprising:
a first proportional integral (PI) controller configured to control a q-axis AC reference current based on a requested maximum AC rotor speed and an estimated maximum AC rotor speed, and
a second PI controller configured to control a q-axis DC reference current based on a requested DC rotor speed and an estimated DC rotor speed;
a field-oriented control (FOC) current loop circuit configured to generate AC and DC reference voltages in response to the q-axis AC reference current and q-axis DC reference current under control of an estimated electrical rotor position and measured feedback currents detected at the electric motor, wherein a d-axis reference current is set to zero;
a sensor-less rotor speed estimator circuit configured to generate an estimated rotor position angle, estimated rotor speed, and torque constant in response to the AC and DC reference voltages and measured feedback currents detected at the electric motor;
a speed signal demodulation circuit comprising:
an AC rotor speed estimation circuit configured to generate the estimated maximum AC rotor speed from the estimated rotor speed,
a DC rotor speed estimation circuit configured to generate the estimated DC rotor speed from the estimated rotor speed, and
a phase angle detection circuit configured to generate a phase angle measure of the AC rotor speed; and a mechanical characteristics estimation circuit configured to determine a plurality of load torque parameters for the electric motor and mechanical load based on the q-axis AC reference current, q-axis DC reference current, a maximum AC rotor speed component, a DC rotor speed component, phase angle measure of the AC rotor speed, and torque constant, where the plurality of load torque parameters comprises a combined moment of inertia parameter, a combined static friction parameter A, a combined viscous friction parameter B, and one or more mechanical parameters representing one or more load characteristics.

2. The system of claim 1, where the one or more mechanical parameters representing one or more load characteristics comprise a mechanical parameter C representing a fan characteristic load that is proportional to a square of a fan rotational speed and/or a mechanical parameter D representing a pump characteristic load that is proportional to a cube of a pump rotational speed.

3. The system of claim 1, further comprising a voltage supply inverter circuit configured to receive the AC and DC reference voltages from the FOC current loop circuit and provide real AC and DC voltages to the electric motor which comprises a 3-phase permanent magnet motor.

4. The system of claim 3, where the 3-phase permanent magnet motor is connected to provide the measured feedback currents to the FOC current loop circuit and sensor-less rotor speed estimator circuit.

5. The system of claim 1, where the FOC current loop circuit comprises a direct-current (d-current) control block, a quadrature-current (q-current) control block, an inverse Park transformation block, a space vector modulation block, a voltage supply inverter (VSI) block, a Clarke transformation block, and a Park transformation block connected to controlling magnetizing and torque-producing components of the stator current in the electric motor.

6. The system of claim 1, where sensor-less rotor speed estimator circuit comprises a rotor flux estimator block and angle tracking observer block which are connected to receive the measured feedback currents and the reference voltages and to generate the estimated rotor angle position, estimated rotor speed, and torque constant.

7. The system of claim 1, where the mechanical characteristics estimation circuit is configured to determine the combined moment of inertia parameter based on the torque constant provided by the sensor-less rotor speed estimator circuit, the phase angle measure of the AC rotor speed, and the estimated maximum AC rotor speed provided by the speed signal demodulation circuit, and the amplitude of the AC q-axis current provided by speed signal modulator circuit $i_{qACmax\_req}$.

8. The system of claim 1, where the mechanical load is selected from a group consisting of a gearbox load, a fan load, and a pump/compressor load.

9. The system of claim 2, where the mechanical characteristics estimation circuit is configured to determine the combined static friction parameter A, the combined viscous friction parameter B, the mechanical parameter C, and the mechanical parameter D in a parameter matrix X by solving a matrix equation $X = W_{rDC}^{-1} \cdot K_T \cdot I_{qDC\_req}$, where $W_{rDC}^{-1}$ is a precalculated inverted speed matrix comprising a plurality of rotor speed values, where $i_q$ DC req is a precalculated q-axis current demand matrix comprising a plurality of q-axis DC reference current values, and where $K_T$ is the torque constant.

10. A method for determining mechanical parameters of an electric motor and mechanical load, the method comprising:
starting the electric motor in an open loop by providing reference voltages to the electric motor that are sufficient to generate a predetermined minimum rotor speed at the electric motor;
activating a speed modulator unit, FOC current loop unit, rotor flux estimator unit, angle tracking observer unit, and speed demodulator unit to initiate a mechanical parameter estimation process in a closed loop;
generating an estimated rotor position, estimated rotor speed, and estimated torque constant with the rotor flux estimator unit and the angle tracking observer unit based on the reference voltages and current feedback measurements from the electric motor;
demodulating the estimated rotor speed into estimated AC and DC rotor speed components at the speed demodulator unit;
modulating AC and DC current reference values to excite the electric motor and mechanical load by corresponding AC and DC torque components at the speed modulator unit based on demanded AC and DC rotor speed components and estimated AC and DC rotor speed components; and
estimating a plurality of load torque parameters for the electric motor and mechanical load based on the demanded AC and DC current values, phase angle of the AC current value, estimated AC and DC rotor speed components, and estimated torque constant,
where the plurality of load torque parameters comprises a combined moment of inertia parameter J, a combined static friction parameter A, a combined viscous friction parameter B, a mechanical parameter C representing a fan characteristic load that is proportional to a square of a fan rotational speed, and mechanical parameter D representing a pump characteristic load that is proportional to a cube of a pump rotational speed.

11. The method of claim 10, where the electric motor comprises a 3-phase permanent magnet motor or a DC permanent magnet motor.

12. The method of claim 10, further comprising generating, by the FOC current loop unit, reference voltages for a voltage supply inverter based on the estimated rotor position, AC and DC current reference values, and current feedback measurements.

13. The method of claim 10, where estimating the plurality of load torque parameters comprises:
constructing a parameter matrix X including matrix values for the combined static friction parameter A, the combined viscous friction parameter B, the mechanical parameter C, and the mechanical parameter D; and
solving a matrix equation $X = W_{rDC\_req}^{-1} \cdot K_T \cdot I_{qDC\_req}$, where $W_{rDC\_req}^{-1}$ is a precalculated inverted speed demand matrix comprising a plurality of rotor speed demand values, where $I_{qDC\_req}$ is a precalculated q-axis current demand matrix comprising a plurality of q-axis DC reference current values, and where $K_T$ is the torque constant.

14. The method of claim 10, where estimating the plurality of load torque parameters comprises:
determining the combined moment of inertia parameter J based on the estimated torque constant, along with a phase angle measure of the AC rotor speed and estimated maximum AC rotor speed provided by the speed demodulator unit and an amplitude of the AC q-axis current provided by the speed modulator unit.

15. The method of claim 10, where the mechanical load is selected from a group consisting of a gearbox load, a fan load, and a pump load.

16. An apparatus for determining mechanical parameters of a combined electric motor and mechanical load, comprising:
  a speed modulator arranged to receive a nominal speed $n_N$ and to produce a q-axis AC reference current $i_{qAC\_req}$, a q-axis DC reference current $i_{qDC\_req}$, a maximum q-axis AC current value $i_{qACmax\_req}$, and a phase angle of the modulated AC voltage phase signal $\theta_{iqAC}$ under control of an estimated maximum AC rotor speed $\omega_{rACmax\_est}$ and an estimated DC rotor speed $\omega_{rDC\_req}$;
  a field-oriented control current loop having an input d-axis reference current $I_{dreq}$ set to zero and arranged to receive the q-axis AC reference current $i_{qDC\_req}$ and q-axis DC reference current $i_{qACmax\_req}$ and to produce reference voltages for a voltage supply inverter under control of an estimated electrical rotor position $\theta_{el\_est}$ and measured feedback currents detected at the electric motor;
  a rotor speed and angle estimator arranged to receive the reference voltages and measured feedback currents detected at the electric motor and to produce an estimated rotor speed $\omega_{r\_est}$a, a torque constant $K_T$, and the estimated electrical rotor position $\theta_{el\_est}$;
  a speed demodulator arranged to receive the estimated rotor speed $\omega_{r\_est}$ and to produce the estimated maximum AC rotor speed $\omega_{rACmax\_est}$, the estimated DC rotor speed $\omega_{rDC\_est}$, and a phase angle measure of the AC rotor speed $\theta_{\omega rAC\_est}$; and
  a mechanical parameters estimator arranged to receive the q-axis DC reference current $i_{qDC\_req}$, maximum q-axis AC current value $i_{qACmax\_req}$, phase angle of the modulated AC voltage phase signal $\theta_{iqAC}$, estimated maximum AC rotor speed $\omega_{rACmax\_est}$, estimated DC rotor speed $\omega_{rDC\_est}$, phase angle of the AC rotor speed $\theta_{\omega rAC\_est}$, and torque constant $K_T$, and to determine a plurality of load torque parameters for the electric motor and mechanical load comprising a combined moment of inertia parameter J, a combined static friction parameter A, a combined viscous friction parameter B, a mechanical parameter C representing a fan characteristic load that is proportional to a square of a fan rotational speed, and mechanical parameter D representing a pump characteristic load that is proportional to a cube of a pump rotational speed.

17. The apparatus of claim 16, where the electric motor comprises a 3-phase permanent magnet motor or a DC permanent magnet motor.

18. The apparatus of claim 16, where the mechanical load is selected from a group consisting of a gearbox load, a fan load, and a pump load.

19. The apparatus of claim 16, where the mechanical parameters estimator is configured to determine the combined static friction parameter A, the combined viscous friction parameter B, the mechanical parameter C, and the mechanical parameter D in a parameter matrix X by solving a matrix equation $X = W_{rDC\_req}^{-1} \cdot K_T \cdot I_{qDC\_req}$, where $W_{rDC\_req}^{-1}$ is a precalculated inverted speed demand matrix comprising a plurality of rotor speed demand values, where $i_{qDC\_req}$ is a precalculated q-axis current demand matrix comprising a plurality of q-axis DC reference current values, and where $K_T$ is the torque constant.

20. The apparatus of claim 16, where the mechanical parameters estimator is configured to determine the combined moment of inertia parameter J based on the torque constant $K_T$, the phase angle measure of the AC rotor speed $\theta_{\omega rAC\_est}$, the estimated maximum AC rotor speed provided by the speed signal demodulation circuit, and the maximum q-axis AC current value $i_{qACmax\_req}$.

* * * * *